(12) United States Patent
Avery

(10) Patent No.: US 7,870,057 B2
(45) Date of Patent: Jan. 11, 2011

(54) METHOD AND SYSTEM FOR REQUESTING A RESERVATION FOR A SET OF DEBT INSTRUMENTS TO BE OFFERED

(76) Inventor: N. Caleb Avery, 930 Tahoe Blvd., Suite 174, Incline Village, NV (US) 89451

(*) Notice: Subject to any disclaimer, the term of this patent is extended or adjusted under 35 U.S.C. 154(b) by 0 days.

(21) Appl. No.: 11/652,945

(22) Filed: Jan. 11, 2007

(65) Prior Publication Data

US 2007/0118465 A1  May 24, 2007

Related U.S. Application Data

(63) Continuation of application No. 11/073,300, filed on Mar. 4, 2005.

(60) Provisional application No. 60/550,963, filed on Mar. 5, 2004.

(51) Int. Cl.
*G06Q 40/00* (2006.01)

(52) U.S. Cl. .................. 705/37; 705/38; 705/36 R; 705/35

(58) Field of Classification Search .......... 705/35–38, 705/34

See application file for complete search history.

(56) References Cited

U.S. PATENT DOCUMENTS

| | | |
|---|---|---|
| 4,903,201 A | 2/1990 | Wagner |
| 5,689,652 A | 11/1997 | Lupien et al. |
| 5,835,896 A | 11/1998 | Fisher et al. |
| 5,845,266 A | 12/1998 | Lupien et al. |
| 5,915,209 A | 6/1999 | Lawrence |
| 5,948,040 A | 9/1999 | DeLorme et al. |
| 6,014,643 A | 1/2000 | Minton |
| 6,021,397 A * | 2/2000 | Jones et al. ............... 705/36 R |

(Continued)

FOREIGN PATENT DOCUMENTS

RU    2161819 C2    1/2001

(Continued)

OTHER PUBLICATIONS

IFCI offers 9 pc coupon to EPFO for roll-over, Businessline. Chennai: May 21, 2003. p. 1.*

(Continued)

*Primary Examiner*—Hani M. Kazimi
*Assistant Examiner*—Clement Graham
(74) *Attorney, Agent, or Firm*—Morrison & Foerster LLP

(57) ABSTRACT

A method and system for the determination of optimal pricing and allocation of securities in an open, competitive environment. The method and system may also be used in developing pre-markets of other items that are difficult to price and allocate in a competitive manner, such as the underwriting/securitization of contracts for property; future revenue/earning streams from an asset and/or group of assets; underwritten insurance portfolios, intellectual property and other goods and services. The system of price optimization and allocation is accomplished by interactive feedback of information using a display and including competitive participation of individual members of the public (and/or their agents) or institutional buyers over a data network e.g., the Internet, uncovering the nature and identification of demand in a self-organizing fashion. Demand emerges through participants' interaction with the system and with each other, via a graphically-supported, interactive reservation process. The number of units available for allocation may be limited.

28 Claims, 13 Drawing Sheets

U.S. PATENT DOCUMENTS

| | | | |
|---|---|---|---|
| 6,058,379 | A | 5/2000 | Odom et al. |
| 6,098,051 | A | 8/2000 | Lupien et al. |
| 6,161,099 | A | 12/2000 | Harrington et al. |
| 6,272,474 | B1 | 8/2001 | Garcia |
| 6,629,082 | B1 | 9/2003 | Hambrecht et al. |
| 7,099,839 | B2 | 8/2006 | Madoff et al. |
| 7,103,565 | B1 | 9/2006 | Vaid |
| 7,415,436 | B1 | 8/2008 | Evelyn et al. |
| 2001/0032164 | A1 | 10/2001 | Kim |
| 2001/0039528 | A1 | 11/2001 | Atkinson et al. |
| 2001/0042785 | A1* | 11/2001 | Walker et al. ............... 235/379 |
| 2002/0010669 | A1* | 1/2002 | Street ......................... 705/36 |
| 2002/0010673 | A1 | 1/2002 | Muller et al. |
| 2002/0035534 | A1 | 3/2002 | Buist et al. |
| 2002/0042769 | A1 | 4/2002 | Gujral et al. |
| 2002/0052816 | A1* | 5/2002 | Clenaghan et al. ............ 705/36 |
| 2002/0055899 | A1 | 5/2002 | Williams |
| 2002/0077954 | A1 | 6/2002 | Slaight et al. |
| 2002/0095327 | A1 | 7/2002 | Zumel et al. |
| 2002/0161671 | A1 | 10/2002 | Matsui et al. |
| 2003/0065608 | A1 | 4/2003 | Cutler |
| 2003/0088488 | A1* | 5/2003 | Solomon et al. .............. 705/35 |
| 2003/0097325 | A1 | 5/2003 | Friesen et al. |
| 2003/0115114 | A1* | 6/2003 | Tateishi et al. ................ 705/26 |
| 2003/0135437 | A1 | 7/2003 | Jacobsen |
| 2003/0139995 | A1 | 7/2003 | Farley |
| 2003/0195780 | A1 | 10/2003 | Arora et al. |
| 2003/0233307 | A1 | 12/2003 | Salvadori et al. |
| 2004/0024684 | A1 | 2/2004 | Montepeque |
| 2004/0039685 | A1 | 2/2004 | Hambrecht et al. |
| 2004/0059665 | A1 | 3/2004 | Suri et al. |
| 2004/0117302 | A1* | 6/2004 | Weichert et al. ............. 705/40 |
| 2005/0080710 | A1 | 4/2005 | Malato et al. |
| 2005/0197857 | A1 | 9/2005 | Avery |
| 2007/0118463 | A1 | 5/2007 | Avery |
| 2007/0118464 | A1 | 5/2007 | Avery |
| 2007/0130053 | A1 | 6/2007 | Avery |
| 2007/0174179 | A1 | 7/2007 | Avery |

FOREIGN PATENT DOCUMENTS

| | | |
|---|---|---|
| RU | 17642 U1 | 10/2001 |
| WO | WO-01/08072 A1 | 2/2001 |
| WO | WO-02/07031 A1 | 1/2002 |
| WO | WO-02/091100 A2 | 11/2002 |
| WO | WO-02/091100 A3 | 11/2002 |

OTHER PUBLICATIONS

Mann, B. (May 26, 2004). "Going Dutch With Google," located at <http://www.fool.com/news/commentary/2004/commentary040526 bm.html>, three pages.

Anonymous. (Date Unknown). "Buying Multiple Items in a Listing (Dutch Auction)," located at <http//pages.ebay.com/help/buy/buyer-multiple.html>, last visited Oct. 13, 2008, two pages.

Anonymous. (2008). "On-line Auction," located at uBid.com, 13 pages.

Austrian Search Report mailed on Sep. 12, 2008, for SG Application No. 200605864-8, filed Mar. 4, 2005, six pages.

Austrian Written Opinion mailed on Sep. 12, 2008, for SG Application No. 200605864-8, filed Mar. 4, 2005, four pages.

Final Office Action mailed on Apr. 17, 2008, for U.S. Appl. No. 11/073,300, filed Mar. 4, 2005, 20 pages.

Final Office Action mailed on Nov. 12, 2008, for U.S. Appl. No. 11/652,761, filed Jan. 12, 2007, 16 pages.

Final Office Action mailed on Nov. 13, 2008, for U.S. Appl. No. 11/652,764, filed Jan. 12, 2007, 17 pages.

Non-Final Office Action mailed on Dec. 29, 2006, for U.S. Appl. No. 11/073,300, filed Mar. 4, 2005, 11 pages.

Non-Final Office Action mailed on Aug. 28, 2007, for U.S. Appl. No. 11/073,300, filed Mar. 4, 2005, 11 pages.

Non-Final Office Action mailed on Nov. 21, 2007, for U.S. Appl. No. 11/073,300, filed Mar. 4, 2005, 14 pages.

Non-Final Office Action mailed on Oct. 17, 2007, for U.S. Appl. No. 11/651,854, filed Jan. 9, 2007, 23 pages.

Non-Final Office Action mailed on Aug. 21, 2008, for U.S. Appl. No. 11/651,854, filed Jan. 9, 2007, 17 pages.

Non-Final Office Action mailed on Oct. 17, 2007, for U.S. Appl. No. 11/652,761, filed Jan. 12, 2007, 13 pages.

Non-Final Office Action mailed on Oct. 17, 2007, for U.S. Appl. No. 11/652,764, filed Jan. 12, 2007, 16 pages.

Non-Final Office Action mailed on Oct. 17, 2007, for U.S. Appl. No. 11/653,129, filed Jan. 12, 2007, 16 pages.

Non-Final Office Action mailed on Dec. 29, 2008, for U.S. Appl. No. 11/073,300, filed Mar. 4, 2005, 18 pages.

U.S. Appl. No. 11/073,300, filed Mar. 4, 2005, by Avery.

U.S. Appl. No. 11/651,854, filed Jan. 9, 2007, by Avery.

U.S. Appl. No. 11/652,761, filed Jan. 12, 2007, by Avery.

U.S. Appl. No. 11/652,764, filed Jan. 12, 2007, by Avery.

U.S. Appl. No. 11/653,129, filed Jan. 12, 2007, by Avery.

Anonymous. (Oct. 5, 1998). "Versant Invests in Global Finance Market Division to Provide Risk and Trading IT Solutions," Abstract, located at <http://proquest.umi.com/pqdweb?index=1&did=34817318&SrchMode=1&sid=4&Fmt=3&V...>, last accessed on Jun. 21, 2009, three pages.

Anonymous. (Apr. 1999). "Montreal Exchange: Canadian Securities Law Report—Canadian Stock Exchanges Manual," Abstract, located at <http://proquest.umi.com/pqdweb?index=0&did= 413679951&SrchMode=1&sid-2&Fmt=3...>, last accessed on Mar. 30, 2009, three pages.

Final Office Action mailed on Feb. 5, 2009, for U.S. Appl. No. 11/653,129, filed Jan. 12, 2007, 18 pages.

Jayaseelan, R. (Jul. 16, 1998). "Webs of Opportunities," *Malaysian Business*, Kuala Lumpur, pp. 56, 7 pages.

Notice of Allowance mailed on Apr. 16, 2009, for U.S. Appl. No. 11/651,854, filed Jan. 1, 2007, 5 pages.

Notice of Allowance mailed on Jun. 26, 2009, for U.S. Appl. No. 11/652,764, filed Jan. 12, 2007, 6 pages.

Notice of Allowance mailed on Jul. 23, 2009, for U.S. Appl. No. 11/652,761, filed Jan. 12, 2007, 7 pages.

Notice of Allowance mailed on Oct. 16, 2009, for U.S. Appl. No. 11/653,129, filed Jan. 12, 2007, 4 pages.

Eurasian Search Report mailed on Jul. 3, 2007, for Eurasian Patent Application No. 200601637, 2 pages.

International Search Report mailed Jan. 11, 2007 for PCT/US05/07212, filed Mar. 4, 2005, 2 pages.

\* cited by examiner

| X Corp. IPO Offering | | | |
|---|---|---|---|
| Reservation Right Request Calculator | | | Click to Accept Terms |
| Amount of Request: | $ 75,000.00 | Balance Remaining | |
| 1st Request: | 3,000 @ $ 11.80 /share | $ 39,600.00 | Request More? |
| 2nd Request: | 2,000 @ $ 11.95 /share | $ 15,700.00 | Request More? |
| 3rd Request: | 1,200 @ $ 12.10 /share | $ 1,180.00 | Request More? |
|  |  |  |  |

Notice: The FairWay Systems Reservation Rights requests <u>constitute neither an "Offer" nor an "Offer for sale"</u> of the anticipated offering. Reservation Rights requests are not binding on the potential issuer nor the potential investor and are subject to cancellation by either party. Reservation Rights requests are only an "indication-of-interest" in the anticipated offering. I have received X Corp.'s preliminary prospectus and will receive a statutory pricing amendment before placing an order.

Current lowest available Reservation Right price is: $11.80 / share

Current estimated Offering price is: $12.00 / share

Click to Place Requests

FIG. 5

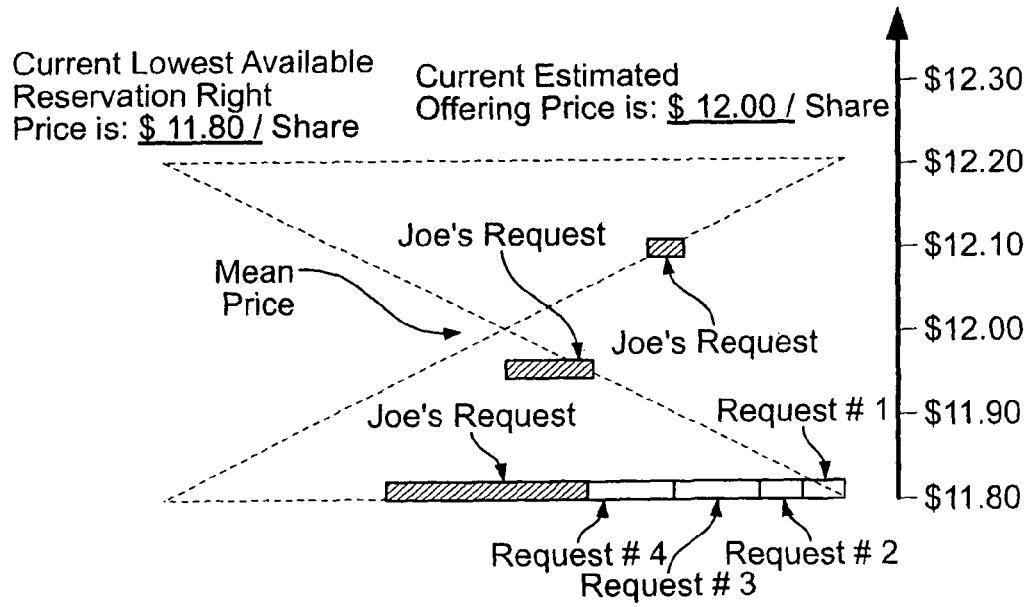

FIG. 6

METHOD AND SYSTEM FOR REQUESTING A RESERVATION FOR A SET OF DEBT INSTRUMENTS TO BE OFFERED

CROSS REFERENCE TO RELATED APPLICATIONS

This application is a continuation of U.S. application Ser. No. 11/073,300 filed Mar. 4, 2005 which claims priority to U.S. Provisional Application No. 60/550,963 filed Mar. 5, 2004 Inventor N. Caleb Avery, both incorporated herein by reference in their entirety.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

FIELD OF THE INVENTION

This invention pertains generally to pricing and optimal pricing and, more specifically, to optimal pricing and information distribution in connection with computer enabled allocation and sales of items such as securities but not so limited.

BACKGROUND OF THE INVENTION

Subject matter of this disclosure pertains to the financial services industry, but it is not so limited. Financial services consist mainly of information flow from the customer to the broker (investment information); from customer to broker (placing orders); broker to market center (order entry); market center to broker (order execution); and finally, back to the customer (execution confirmation). Hence, they lend themselves to communications via electronic media such as the Internet and other data and computer networks.

One aspect of the financial services industry is new issuances to offer and issue shares of stock and/or debt in a company or entity to the public. This process of identifying potential buyers and gauging their demand is referred to in the investment banking field as book building. In non-securities based applications this process is called building an order boo. The current process of book building by investment bankers typically includes several stages. In the first step, the underwriter or investment banking firm determines which investors will be invited to participate. Typically this involves certain favored investors. Next, the underwriter obtains indications of interest from those invited to participate. These might be in the form of bids of various types. At this point, the underwriter has an appreciation of the demand curve for the new issue, including and when bids were submitted and/or revised. At this point, the underwriter arrives at an issuance price, although it is not understood how this is done by those outside the investment banking community. As a result, there is frequently oversubscription, where more shares or debt instruments are requested than are available. There have been a number of techniques used to deal with oversubscription; for instance, distribution of shares on a pro-rata basis.

In general, this process is believed to be relatively inefficient and unattractive, at least from the standpoint of the issuers. As currently carried out, book building is neither democratic nor equitable nor open to the public. A number of abuses have been identified in the current system. One is spinning of shares in the so-called "hot" (highly in demand) initial public offerings to favored investment banking clients. Amongst abuses in addition to the spinning problem are underpricing by investment bankers of initial public offerings. It is believed that underpricing has certain advantages for investment bankers but deprives the issuer of funds creating a "conflict-of-interest" between the investment banker and their customer, the issuer. It is believed that underpricing occurs both with equity (stock) and with debt issuances. Other abuses include "tie-ins," unlawful quid pro quo side agreements, yield burning, artificial inflation of after-market prices in the secondary market ("laddering"), and biased recommendations by research analysts working for investment banks.

Underpricing is believed especially to damage the issuers and the markets. Also connected with underpricing abuses is post-issuance flipping, i.e., immediate sales by the favored recipients of initial public offerings. In addition, current approaches do not provide for quantity discounts for large purchasers, or purchasers who help set the price with early indications-of-interest. Furthermore, as a result of its monopoly power in pricing new issuances, the underwriting industry faces antitrust issues.

In addition, there are globalization issues in connection with securities offerings due to the presence of competitive international markets and differing regulations between countries.

People have recognized these problems and some solutions have been implemented; however, all are unsatisfactory. One method is direct public offerings of securities via the Internet. There have been over 200 direct public offerings carried out via the Internet in the United States. They typically involve relatively little participation by underwriters with instead the issuer offering the equities direct to the public. Of course, this system does not provide any actual specific pricing mechanism.

Other approaches to new issuances include Internet options such as the well-known Dutch auction of initial public offerings. In this case, most of the pricing and allocation decisions are removed from the discretion of the issuer and/or underwriter. Investors express their interest level and price threshold, and the offering price is set at the highest level at which all the shares to be offered might be sold (i.e., the "clearing price"). Any bidder might bid for as many shares as he wants. The actual offering price is fixed at the maximum price at which all shares are cleared (sold) with regard to the portfolio of bids. Allocation sometimes includes reduction of the number of shares offered to each bidder, perhaps on a pro rata basis.

There are drawbacks to Dutch auctions. First, there is lack of transparency and feedback in that the bidders are bidding "blind" and are typically uncertain as to what other bids are being offered. Consequently, there is little or no information provided back to the bidders, except perhaps informally. Because of the lack of feedback, Dutch auctions also typically exhibit underpricing problems. The company's investment bankers often still set the final offering price at their discretion, since they can manipulate the number of shares on offer and hence the price. Uncertainties regarding bids, and the lack of consistent methods of valuation and related pricing information, constitute an inadequate approach to determining appropriate initial prices, thereby minimizing attractiveness of the Dutch auction, at least in the United States equity market.

Another approach which has been used is an new issuance entirely via electronic mail, involving the issuer taking conditional offers to buy shares without deeming it to be a pre-effective sale under the U.S. SEC (Securities Exchange Commission) rules. In this case, the issuer circulates an e-mail notice after posting a prospectus on the Internet. Bidders are allowed to bid on the shares after opening an account to do so.

Then, before the actual effectiveness of the registration statement in connection with the stock issuance, an e-mail notice is sent requesting reaffirmation of the offers to buy without an actual commitment to buy. Subsequently, after the registration statement of the issuance is effective, an e-mail notice is sent to each bidder stating that the offering is about to price, and that the offers will be binding unless withdrawn immediately. Again, this approach includes no particular provision of providing bidding information back to the bidders.

Similar options have been used in the debt market; for instance, for municipal bonds issued by public entities. These consist primarily of numerical auctions. Typically, the bidder cannot see all bids and only the latest best price (i.e., lowest yield) is visible. However, except for the auctions of U.S. Treasury securities, auction systems for other types of debt instrument have been relatively rare.

SUMMARY

There are clearly a large number of shortcomings and abuses in the current book building system, and the existing electronic auction type systems do not solve all of these issues. The present inventor has identified the chief problem with the current approach as being inadequate information provided to the prospective purchasers of securities or other items. This is typically most problematic where there is no clear price or value on the item being sold, such as new issue securities, especially equities, but not so limited. Typically, none of the current approaches provide much useful information about the other bidders and their bids, or provide feedback as to a given bidder's likelihood of getting an allocation. For instance, in the Dutch auction, the information flow is one way, from the bidders to the issuer/underwriter.

Therefore, the present system is directed to providing information back to the bidders so that they might make or modify their bids in light of the other bids, thereby gaining a sense of what the relevant market (i.e., the other bidders), believes the value of the security or other items being sold to be. Hence, bids might be modified over time in response to bids made by other bidders. This competitive, transparent, dynamic, and interactive close-loop bidding system enables bidders to arrive at a true market value of the securities or other items, prior to the actual closing of the offering, e.g., the actual sale.

The present system (hereinafter System or system) and its associated methods are flexible so as to be implemented in a variety of embodiments, which might accommodate the applicable securities laws and regulations of any given legal and/or regulatory marketplace and/or contractual jurisdiction for non-securities-based items (i.e., locally in a given jurisdiction and/or globally across jurisdictions). The numerous financial markets, exchanges, and contractual jurisdictions around the world contain their own particular set of relevant legal and regulatory requirements. Furthermore, the system can also be applied to price discovery and allocation of non-securities-based items and contracts for items that are difficult to price and to allocate fairly and efficiently.

The system is equally applicable to the price discovery and allocation processes of new issuances of both equity and debt (including but not limited to: commercial paper, corporate bonds, municipal bonds, international bonds, sovereign debt, etc.), alike (as well as of non-securities-based products and items, services, and rights). For the purposes of illustration and discussion, this disclosure also uses the set of circumstances surrounding initial public offerings (IPOs) of equity, for reasons including:

1) The problems of price discovery and allocation in IPOs are perhaps more fully academically researched and documented than in new issuances of debt and/or contracts or other non-securities-based items and applications;
2) first time issuers of public equity securities are typically earlier-stage enterprises and are thus potentially more vulnerable to underwriting and manual book-building abuses than issuers of sovereign, municipal, public or corporate debt, which tend to represent established organizations or governmental entities with track records of financial performance, or the underwriting/securitization of other items, (e.g., property portfolios, future revenue/earnings streams of financial instruments and/or contracts, other asset types, good/services);
3) the potential for inequity and abuses in the IPO process might be more inherent, and therefore more prominent and exaggerated than in new issuances of debt or the securitization of a contract, and thus serve the purposes of illustration of the methodology and system concepts and this discussion;
4) there exists a more advanced stage of criminal and civil legal discovery of the abuses of the IPO process, and thus a significant amount of evidence is accumulating and is actionable;
5) there is an escalating resulting perception of inequity and scandal in reaction to abuses of the IPO process; and
6) higher visibility and increased awareness of the problems could lead to implementation of pricing optimization and improved allocation in other securities areas, and in a variety of applications.

The present system provides a method of determining optimal pricing (i.e., price discovery) and the fair allocation and reservation of requests (i.e., "indications-of-interest") prior to the offer or offer for sale of the actual equity and/or debt or referenced securities, related instruments, and/or other assets also called units here. The system does this interactively with all Participants by establishing the nature of demand in the pre-market through feedback, thus enabling demand behavior to emerge as the pre-market self-organizes. The items being priced (e.g., particular securities, commodities, securitized assets, units of services, etc.), are substantially identical and hence also referred to herein as units.

The present system is also useful in pricing discovery and allocation of non-securities-based items. For example, the system can be used to analyze, price, hedge, and allocate risk during the process of insurance underwriting. In another example, the System can also be used to price and allocate a portfolio of assets (e.g., real estate) that have been packaged and securitized. The System can also be used to price and allocate the securitization of one or more agreements for the benefits and/or outputs of contracts or similar instruments (e.g. a revenue or income stream, royalties from intellectual property, etc.). The system can be used to price and allocate units of goods/services by building an order book. Furthermore, the system can also be used in instances where the supply might also be varied by the Issuer or Seller, based on the emerging demand discovered by Participant interaction (e.g., pricing and allocating a production run of semiconductor chips which can be expanded by increased production).

This process is accomplished fairly and efficiently by interactive collection of indications of demand and real-time feedback display of the aggregate demand to all Participants through a private and/or public data network (e.g., the Internet). Various embodiments do this by establishing and building what is referred to here as a Bidstream of the demand for an anticipated new issuance, or the sale of a multiplicity of like goods and/or service units through what is referred to here as Reservation Rights. The Bidstream can be represented by a graphic depiction of Reservation Rights BidBlocks, which can be organized horizontally and/or vertically on a visual display, called a Demand Display screen. A BidBlock is a place in the Bidstream representing one or more Bidstream units. By selection of a limit to the number of BidBlocks or units at a given price/volume, an Implementer of the system can choose whether or not to give a particular Bidstream a recognizable visual appearance to aid Participants in analyzing the emerging demand as the pre-market self-organizes.

Typically (though not always) in securities applications, a Reservation Right is not a legal and binding contractual obligation, nor an investment contract. Rather, a Reservation Right request represents an "indication-of-interest" or reservation based on potential investor/buyer feedback of demand for volumes and prices of an anticipated offering of securities, related instruments, and/or other assets, goods, or services. The Reservation Right request is essentially a proxy for demand, and is used for the purposes of optimizing pricing and promoting fairness in allocation as a pre-market activity—a more efficient and equitable alternative to current manual book-building or order book building processes.

Depending on relevant securities and contractual laws/regulations, Reservation Rights could also be options, warrants, or similar conditional instruments where applicable. Where legal prohibitions and regulations do not restrict referenced securities, a more direct linkage might be offered between the Reservation Right and the securities and/or other assets eventually being offered as they become offered or finally available for sale. In the case of non-securities based applications, if allowed under relevant contractual law, the Reservation Right can be binding.

The system can be used not only to develop a fair, equitable, and transparent new issuance process for equity (stock) and/or debt (e.g., bonds, notes, commercial paper, etc.) securities (and for related and/or similar instruments, and/or rights), but can also provide a properly priced and allocated base of investors for a stable after-market. Under the present method, first-day arbitrage might be mitigated or removed altogether, reducing secondary market volatility. If conducting new issuances is relatively easy and inexpensive, this will increase the availability and lower cost of equity and/or debt finance. Similarly, a liquid and transparent secondary market will encourage investors to participate in the stock and debt markets, and should again increase the availability of capital and lower investor's required returns. Likewise, improvements in the efficiency, transparency, competition, and open access of various debt markets might encourage more issuers to achieve their goals through the efficient and appropriate use of debt instruments, and to extend the access of debt markets to a whole new group of potential investors on a level playing field.

Moreover, the system can be used in a number of non-securities-based applications where fair and equitable pricing and allocation have typically been difficult to optimize, determine, and execute.

In this disclosure, the terms: (1) Implementers refers to those parties using methods and system embodiments to design and build various price discovery and allocation systems; (2) Operators refers to personnel of issuers, underwriter syndicate members, and their affiliated broker-dealer network and/or third-party service/portal providers whose responsibility it is to run and manage the daily operation of an implementation and/or embodiment; (3) Issuer Group/Seller might include the issuer of an anticipated new issuance of securities, securitization of assets, or any other asset/item which is anticipated to be sold and any affiliated underwriter syndicate, affiliated broker-dealer network, and, sometimes, any third-party service providers and/or portal providers who supply services to other members of the Issuer Group/Seller and (4) Participants refers to potential investors, potential asset buyers, buyers of goods/services and/or their agents who download information, place requests for Reservation Rights of securities and/or other assets, goods/services, and/or otherwise interact with the system. In the case of non-securities based applications where the timing of acceptance of bids are not regulated, many times the roles of the Operator and Issuer Group are merged, and are simply the Seller of the assets, goods, and/or services.

Therefore, in accordance with the invention, a system is provided, which is not necessarily an auction per se, but is a pricing and allocation system and method. The pricing method allows the Seller to choose to sell the units on sale to the bidders at other than the actual price bid by any particular bidder, and even in some cases at a price higher than a particular bidder has requested. Generally, this price adjustment would be by prior agreement. More generally, this disclosure is directed to a system and method for taking reservations from an allocation pool of units to be sold. Feedback is provided to those making the reservations (bidders or Participants). The feedback includes information on the reservation requests made by the other requestors (Participants) in terms of how many units and at what price they are interested in buying. This information can be presented to all users of the System (i.e., Operators, Issuer Group/Sellers, and Participants) in graphic format.

BRIEF DESCRIPTION OF THE DRAWINGS

FIG. 5 shows an example of a Reservation Rights request calculator display.

FIG. 6 shows the corresponding Demand Display provided to an example Participant after accepting and registering the his requests.

FIG. 20 also shows acceptance of a new reservation at a lower yield, the cancellation of a previous reservation at a higher yield and the notification to the holder of the cancelled Reservation Right.

DETAILED DESCRIPTION

Overview

The present system and method are capable of building what is referred to here as a Bidstream. A Bidstream is created by the collection of indications of demand (also referred to herein as reservations and feedback i.e., a report) of the aggregate demand. Prior reservations can be provided to some or all Participants. Various embodiments accomplish this by establishing and building a Bidstream of the demand for an anticipated new issuance, securitization of rights to assets, or for the sale of units of goods/services through the Reservation Rights. The Bidstream can be represented by a graphic depiction of Reservation Rights or BidBlock units, organized horizontally and/or vertically on a visual computer display, called a Demand Display screen. Each Participant and/or their agent requests a quantity of reservations of BidBlocks at price points in the Bidstream. These reservation requests are then accepted and registered by the system if those BidBlocks are still available at the time of the request. The system has the optional feedback of a graphic representation of all currently requested demand in the Bidstream. There are also optional feedback mechanisms for the relative position of a given Participant's accepted and registered request (or set of requests) in the Bidstream (e.g., using unit blocks of a different representation i.e., color, text markings, pointers, lists, tables, etc.). Cognitive research indicates that humans understand, analyze, and respond more successfully to graphic visual information rather than to purely numeric representations and/or statistics.

Figure 1:
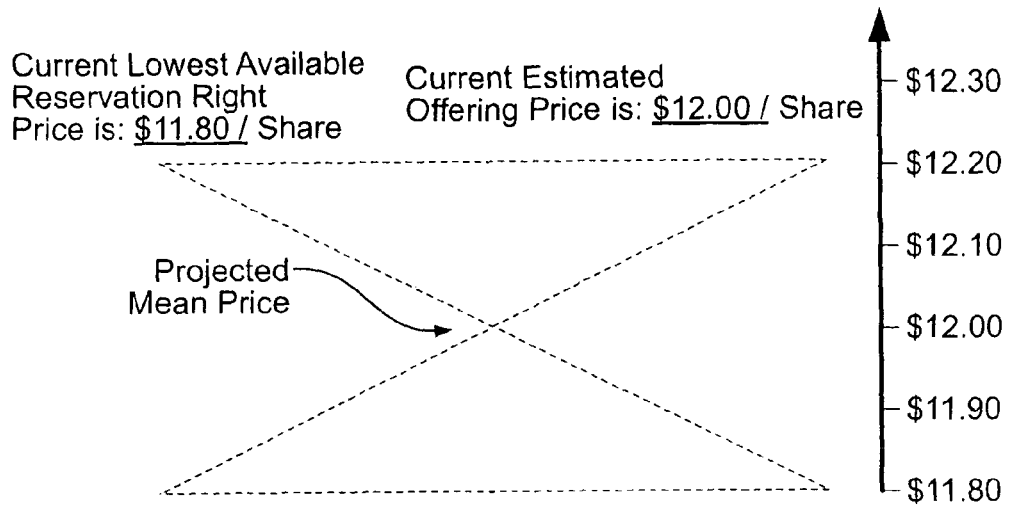
FIG. 1 is a graphic representation of potential BidBlocks available, including initial price range, and the number of units available at each price point that is provided to users of the system.
Figure 2:
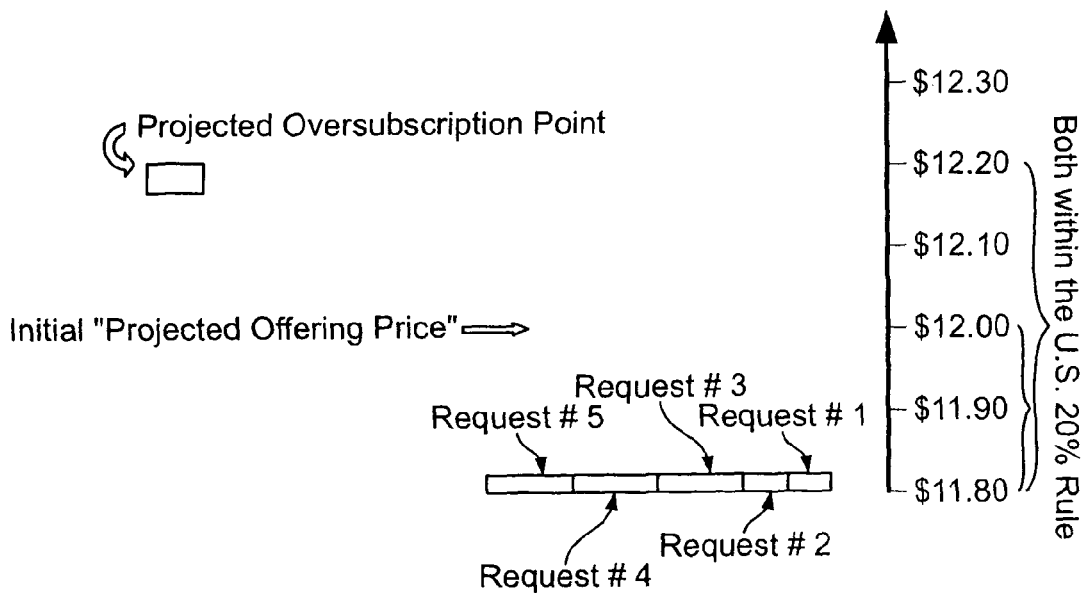
FIG. 2 is a graphic representation of BidBlocks available with certain BidBlocks filled in as reservations are requested, accepted, and reserved.

The system Implementer can choose to give a particular Bidstream as represented on a computer display a recognizable visual appearance by selection or not of a limit to the available number of BidBlocks or units at a given price/volume, in order to aid Participants in analyzing the emerging demand as the pre-market self-organizes. A computer graphic representation of an outline of the available BidBlocks can be provided to the Participants all at once in the geometric continuous embodiment (FIG. 1), or in a sequential step-function with BidBlocks filled in as reservations are requested in the geometric step-build embodiment (FIG. 2), where each Reservation Right is shown as a rectangle whose length represents the number of BidBlock units reserved along the horizontal axis of the graph, and price is shown along the vertical axis.

Figure 3:
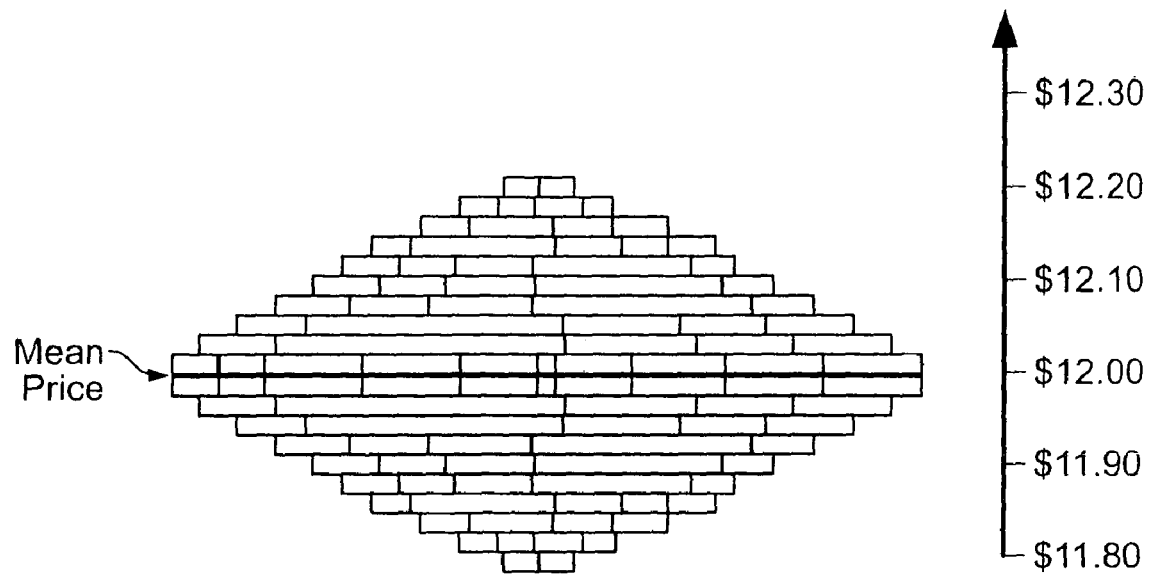
FIGS. 3 and 4 indicate alternative means of assisting the Participant with respect to building the Bidstream for providing a graphical representation of the bids. These different geometric shapes offer a different number of potential BidBlock units at each price range and Bidstream design can be used to influence Bidstream building behavior.
Figure 4:
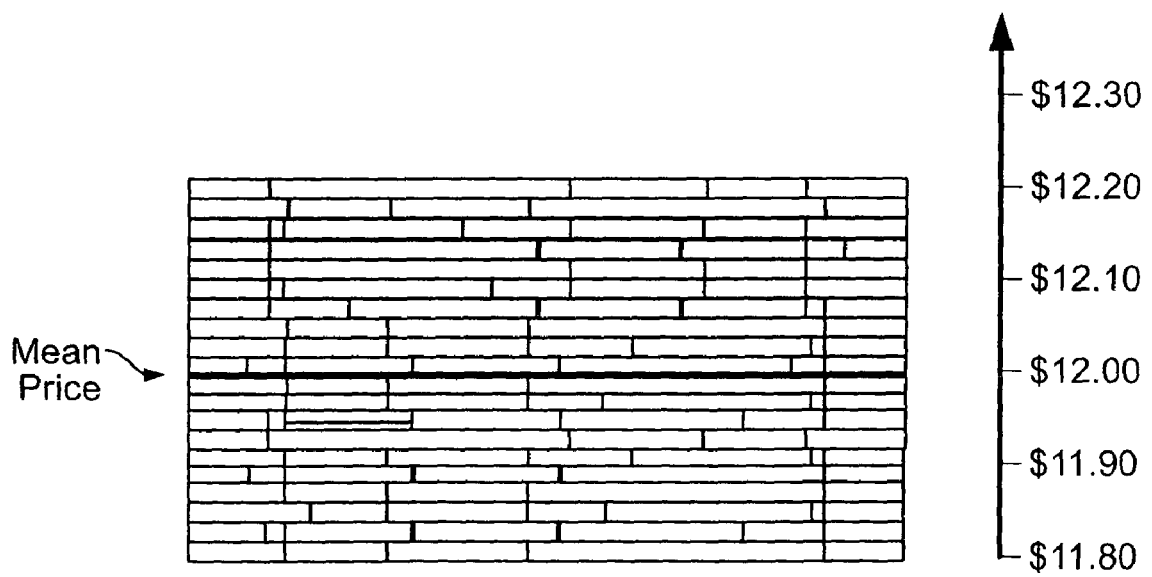

Any variety of geometric shapes can be employed in the graphic representation to assist Participants with respect to the building of the Bidstream, and to give Participants a visual representation of their positioning in the entire Bidstream building process; for additional examples, see FIGS. 3 and 4. In the case of FIG. 3, there is a steeper discount for providing early bidding information, but also a higher probability of being one of the earlier reservations subject to cancellation if the system goes into oversubscription mode. In FIG. 4, there are an equal number of Reservation Rights BidBlocks at each given price point, so Participants are more concerned with what price level they have successfully reserved rather than how many BidBlocks are on their level. See Rewards for Information Production below.

The System's visual feedback provides Participants a new level of interactivity and control over their own strategy. Participants can place multiple requests at different positions in the Bidstream, based on their desire to achieve an overall price and volume allotment position at the time of the eventual offer or sale of securities, or assets, or units of goods/services when they become effective and/or available for sale. Likewise, tables can be used to display feedback to the user about the percent of BidBlocks reserved, the pricing momentum of the placement of reservations, and/or other Bidstream metrics.

A potential investor and/or buyer (Participant) can become involved in building a Bidstream, and obtaining an allocation in an anticipated offering and/or sale, as follows: First, in a U.S. jurisdiction-specific securities-based example, a Participant must contact their broker or the underwriter, to establish suitability for their participation in the anticipated offering. For security purposes, the broker sends the accepted Participant a log-on name and password, and sends them in conjunction with account limits to the Operator of the system. The Participant is then free to log on (i.e., over a data network such as the Internet) to the pertinent system hosting site to download the registration statement, preliminary prospectus, and any related materials, e.g., electronic roadshows.

When ready, Participants can simply fill out a blank electronic form provided at the hosting site indicating their requests for the number of shares desired, and at what prices; or can use a provided Reservation Right request calculator.

Assume that a sample Participant, Joe, has up to $75,000 that he is willing to commit to investing in X Corp.'s anticipated IPO. He would log on to a suitable Internet website with the password provided by his broker and be authorized to gain access and participate. After viewing the current Bidstream online, Joe can launch the website's Reservation Right request calculator. In a U.S. jurisdiction-specific securities-based embodiment, Joe must first acknowledge that he understands that his request is a non-binding indication-of-interest, and then accept any statutory disclaimers that Reservation Rights requests do not constitute an offer or offer for sale.

Joe can chose to spread his requests over a given price range, with the understanding that his lowest price requests might be easily rescinded (cancelled) if the Bidstream is oversubscribed. This multiple-request positioning strategy allows Joe a minor degree of protection in getting what he wants, but also frees Joe from monitoring the Demand Display continually. Continuing our example, Joe enters the $75,000 and places a request for 3,000 shares @$11.80/share. The request calculator (a simple arithmetic web service module) computes the request, shows Joe interactively how much of the $75,000 he has left to work with, and asks whether he wants to make a second request. Accepting his first request, Joe places a second request for 2,000 shares @ $11.95/share, looks at the balance, and based on a quick calculation he places most of the remainder for 1,200 shares @ $12.10/share. When Joe gets where he wants to be positioned, he accepts his initial allocation requests and they are submitted to the Bidstream. Joe can choose to use the Reservation Rights request calculator to go back and forth between his requests and refine his Reservation Rights request placement strategy for various unit quantities at various price points, or in combinations of various quantities and various price points. FIG. 5 shows Joe's current Reservation Rights request calculator screen, and FIG. 6 shows what Joe would now see in the Demand Display.

Figure 7:
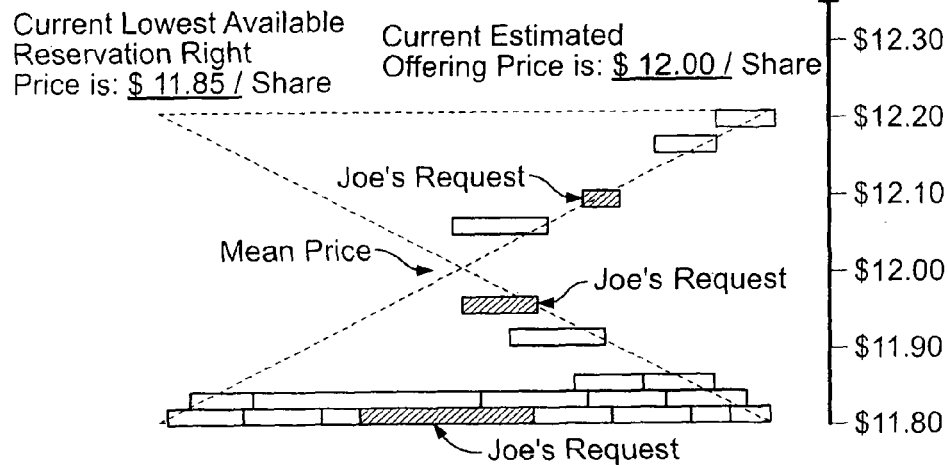
FIG. 7 shows a request for an example Participant's status information along with those of other Participants.

As the Bidstream continues to build with subsequent reservations from other Participants, a picture emerges of the demand behavior and strategic request positioning by those Participants requesting allocation BidBlocks that have been accepted and registered by the system. This informational transparency mitigates (or even eliminates) the potential for abuse due to the asymmetry of information available outside official disclosure documents, such as prospectuses or legal (as well as illegal) selective disclosures. FIG. 7 shows Joe's requests, along with those of other Participants highlighted in this embodiment.

The aggregated requests for Reservation Rights build a Bidstream and represent the true market demand for either a new issuance, or securitization of the contracting for an asset or group of assets, or the sales of units of goods/services. This transparent, competitive, and iterative process of the discovery of demand maximizes the proceeds to the Issuer Group/Seller. Likewise, in the case of a debt offering, the process minimizes the effective yield the Issuer must pay to achieve its offering objectives.

Oversubscription

Figure 8:
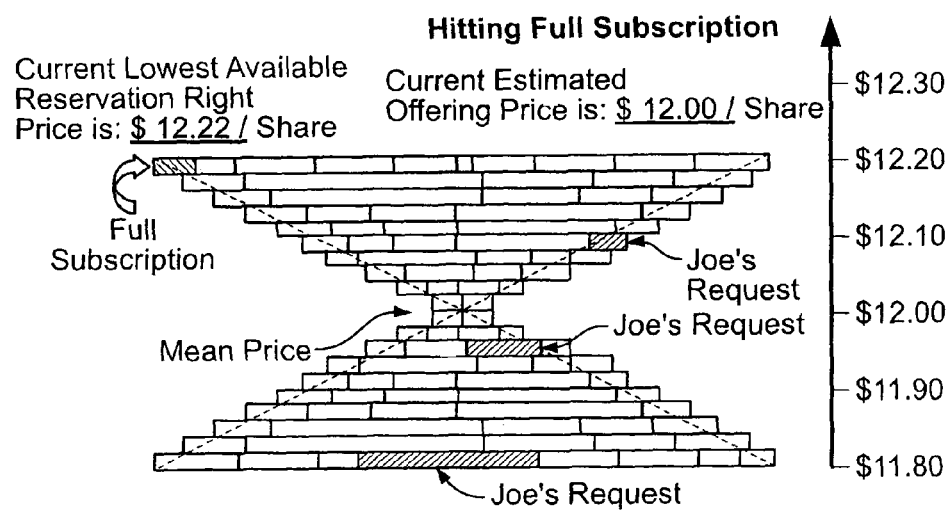
FIG. 8 shows graphically the situation of reaching full subscription and triggering oversubscription of an offering.
Figure 9:
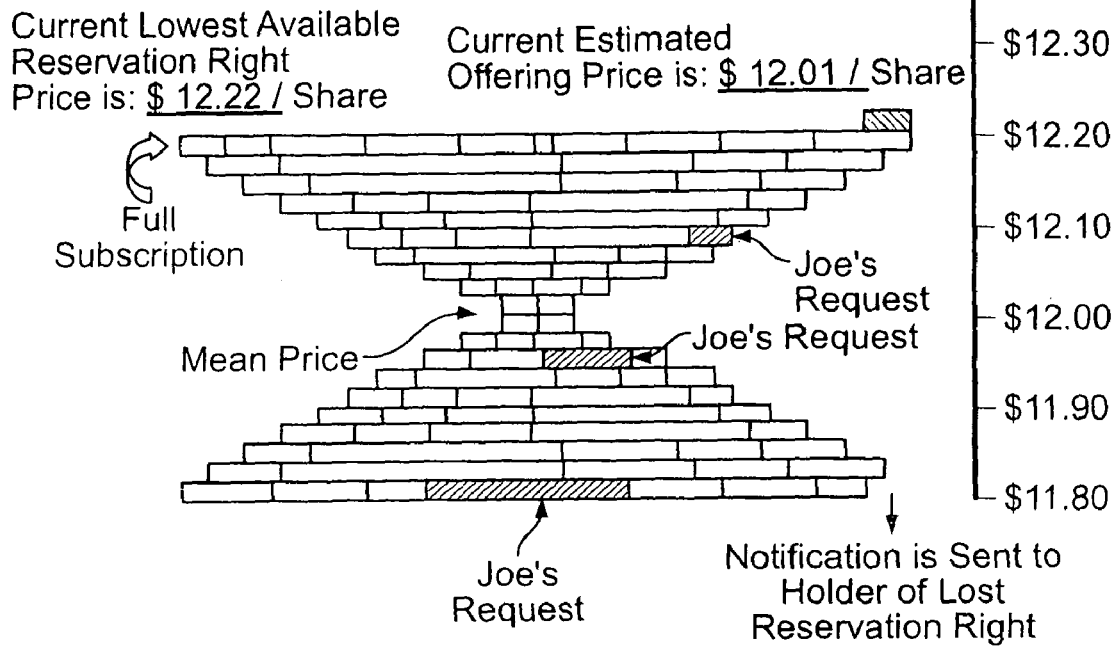
FIGS. 9 and 10 show how new Reservation Rights can be added and previous Reservation Rights can be rescinded and/or cancelled. The Figures also indicate the action of notification to the holders of the cancelled Reservation Rights.
Figure 10:
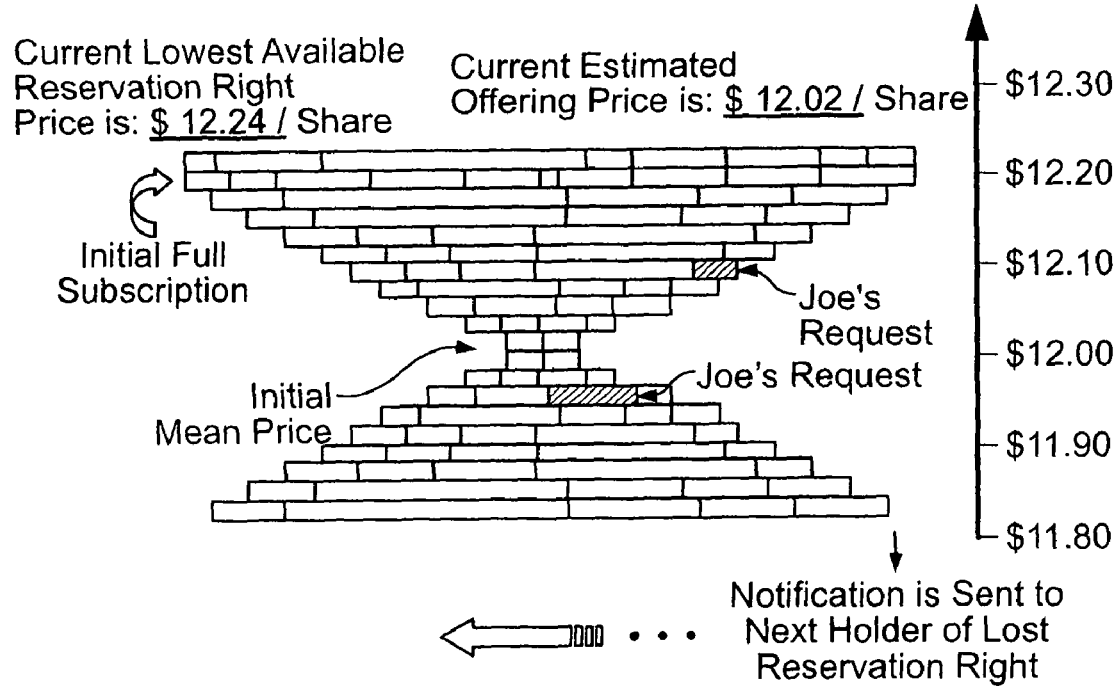

The system might hit a level of oversubscription, whereby all units available for the upcoming anticipated equity or debt offering, or units related to the securitization of an asset or group of assets, or units of goods/services for sale, are reserved (FIG. 8). The Bidstream continues to move in search of the optimized price reflected by true demand. In this geometric Bidstream build example, new Reservation Rights units can be added at the next pricing point, and an equal number of Reservation Rights units can be rescinded and/or cancelled from the Participants' lowest price point positions in the Bidstream (FIGS. 9 and 10). In cases where it is desirable or required to keep the total proceeds from an offering or sale constant, a greater number of units at the lowest price point can be rescinded and/or cancelled for each new unit accepted into the Bidstream at a higher price point.

In FIG. 10, additional oversubscription Reservation Rights requests are shown accepted @ $12.22/share by the system, and it continues to cancel Reservation Rights requests @ $11.80 until the entire initial allotment @ $11.80/share is cancelled. Note that Joe has now lost his Reservation Right request BidBlocks @ $11.80/share, but still has two remaining allotment positions with two different unit quantities at two different price points. If the system notifies Joe of his lost Reservation Right request, he might also be reminded that he still has two valid requests (2,000 shares @ $11.95 and 1,200 shares @ $12.10). He might also be asked by the system whether he wishes to replace his lost allotment position with another request, and given the current calculation of how many shares that would reserve him at the current condition of the Bidstream. In practice, system Implementers can choose to rescind and/or cancel lowest price point units in the reverse order in which they were accepted at a given price point, in order to reward the information provided by Participants who committed earlier at that price point.

To maintain the Bidstream's distribution or shape in a geometric Bidstream build, the System can reset itself and make adjustments to the available number of allotted BidBlocks at each price. Simply put, some of the Reservation Rights request BidBlocks at the end of a row can be bumped up or down a row to maintain the allotment limit at each new price consistent with the previous geometric shape. Optionally, any Participant whose Reservation Right was re-priced to maintain the geometric distribution of the Bidstream can be notified of their new position in the Bidstream. Depending on the geometric shape employed by the Implementer, it is likely that such price adjustments would be no more than 1% to 3% and the system pricing model rules and variance would typically be disclosed to the Participants in advance. In effect, the system thereby changes upward or downward some of the bids unilaterally, but by prior authorization. In this example, the new estimated offering price is now $12.02/share.

Figure 11:
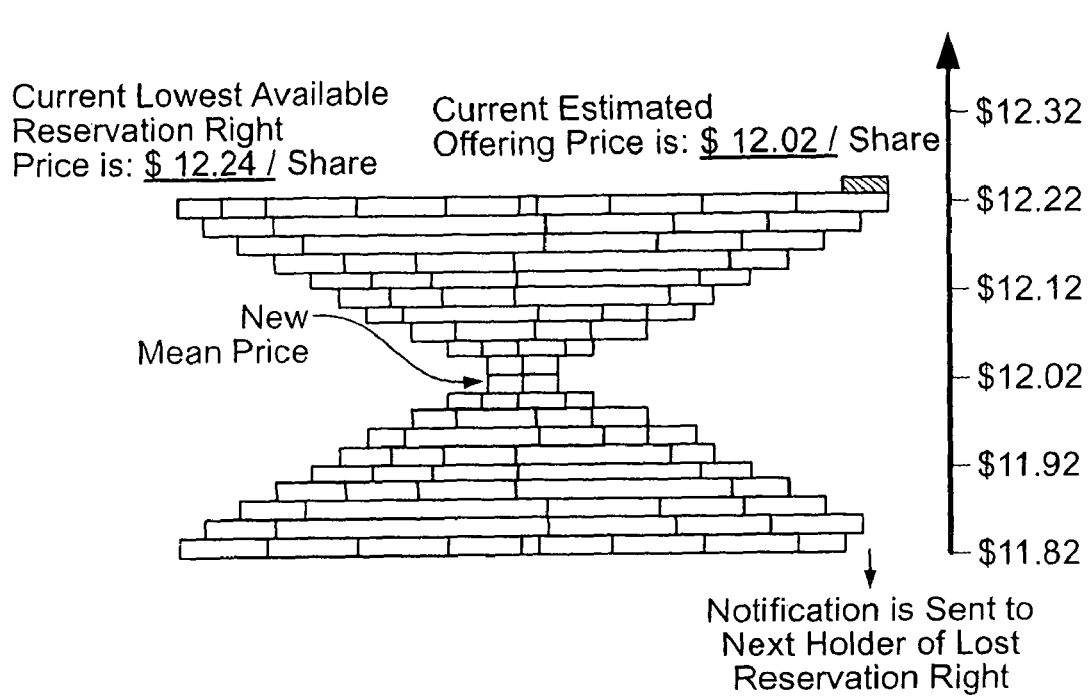
FIG. 11 shows the occurrence the price range being reset and of new oversubscription Reservation Right request being accepted and reserved.

FIG. 11 shows where new oversubscription Reservation Right requests are accepted and reserved @ $12.24/share, additional Reservation Right requests @ $11.82/share are cancelled, and the holder of the lost Reservation Rights is notified. The process continues with the system resetting itself every time new Reservation Rights requests at the new highest price replace the complete allotment at a given lowest price.

For the Issuer Group and/or Seller, this movement of the Bidstream optimizes price discovery, maximizing the final proceeds, until the demand is exhausted. Each potential investor and/or buyer is allowed all the units he wants, up to a given a price volume allotment limit as chosen by the Issuer Group/Seller using the geometric continuous Bidstream embodiment. The Demand Display gives Participants full and transparent access to the whole offering process, and an interactive analysis of emerging demand behavior.

When the Bidstream building is closed in preparation for the offering going effective (i.e., the actual sales of the securities) or, similarly, other types of units of goods/services are ready for a binding sale, the pre-market demand has self-organized and the entire market has accurately built the book itself. The units are then allocated among the Participants according to quantities specified by the still accepted and registered Reservation Rights requests. The selling price for each allocation can be based on the price point of a given request or calculated by a formula. The new issuance offering price for an IPO is typically the arithmetic mean price of all requests, but can be calculated by any suitable function which is typically disclosed in the prospectus (such as the weighted average, the median, etc.). In this example, the mean and the median are the same price because of the Bidstream geometric shape chosen by the Issuer Group.

In this example of a securities-based offering, the system notifies all Participants still remaining in the Bidstream of their position in the Bidstream (e.g., by e-mail), and the broker proceeds to fill requests for allocations in the offering with actual formal offers to sell. In cases where binding bidding is allowed, upon closing the Bidstream, the Seller would confirm sales orders and proceed to fill them.

The system inherently allows for Participant-determined price discrimination. In the U.S., the SEC (Securities Exchange Commission) could allow variable final pricing for the actual sales by a No-action Letter determination, enabling each Participant to pay what he requested, rather than the single system-calculated offering price. With variable pricing already available for debt and for equities in certain legal and regulatory jurisdictions, this promotes a natural trend toward a more competitive pre-market. In most non-securities based applications of the system, price discrimination also would reward earlier successful bidders with greater discounts from the price paid by subsequent successful bidders. This feature would encourage Participants to interact with the system to gain maximum personal advantage for their production of information, by extension causing them to make their requests early and often. For additional embodiments that reward information production, see below.

The next pricing point can be determined based on the embodiment. In the case of a continuous step-function embodiment, the next pricing point is at, or higher than, the last price reserved (or lowest yield, in the case of debt). In other embodiments, the next pricing point might be anything over the mean price or lowest yield of all reservations; and in the "free-bid" embodiment (see below), a mean or weighted average (or similar quantitative measurement) of all of the distributed requests could be used as the basis for a floor on subsequent requests for Reservation Rights.

These are just some of the next pricing-point options available to the Issuer Group/Seller through the system. The actual choice of the final pricing method to be implemented and enforced through system rules would normally be assigned to the Operators of the system by the Issuer Group/Seller. These conditions would also typically be disclosed in registration materials, and/or offering documents and/or announcements (e.g., registration statements, red herrings, preliminary prospectuses, official statements, indenture agreements, etc.), or sales materials in the case of non-securities applications of the method.

Free-Bid Bidstream

The disclosure above describes one embodiment—building a Bidstream in a fixed geometric figure method, where an initial-state Bidstream is graphically presented as a series of available allocation BidBlocks with a limited quantity of reservation BidBlocks at each price point. The Bidstream embodiment is filled with Reservation Rights requests until it reaches an oversubscription mode. At this point, the initial-state Bidstream is reset to accommodate new Reservation Rights requests at higher prices or lower yields at or above a set point (e.g., a median price/yield, a mean price/yield, a weighted average price/yield, the last price/yield which triggered oversubscription mode, etc.). These new requests at a higher price point in the Bidstream can cancel out previous requests at the lowest price point in the Bidstream, and those lower Reservation Rights positions can be removed.

However, the Bidstream need not be built in a sequential fashion, or even by limiting the available quantity of units allotment at a given price/yield point. As previously noted, in some legal and regulatory jurisdictions (e.g., France), paying what you bid in a final equity offering is allowed and even encouraged. This practice is in contrast to the settlement of one price for all securities at the time of offering, the current practice in the United States for new issuances of equities.

Regardless of applicable jurisdictions, the Issuer Group/Seller can choose to implement the system in a free-bid embodiment. In a free-bid embodiment, Participants and/or their agents can place one or more Reservation Rights requests in any volume and at any price/yield level. As in other embodiments of the system, these Reservation Rights requests can be displayed in real-time.

The free-bid embodiment is potentially attractive to the Issuer Group/Seller because Bidstream formation behaviors might be exhibited earlier in the process, allowing more time to adjust their strategy and increasing competition. This approach can provide the Participants' agents (including investment professionals [e.g., members of the underwriter syndicate and broker-dealer networks] or other buyer representatives) with more time to advise their clients toward best achieving the client's overall price/yield and allocation wishes, including hybrid mixtures of price/yield and volume requests. Consequently, the probability is raised for all Participants in the eventual offering, or asset sale/underwriting, or sale of units of goods/services to arrive at the most equitable and satisfactory position in the remaining Reservation Rights that survive the competitive, iterative process.

Figure 12:
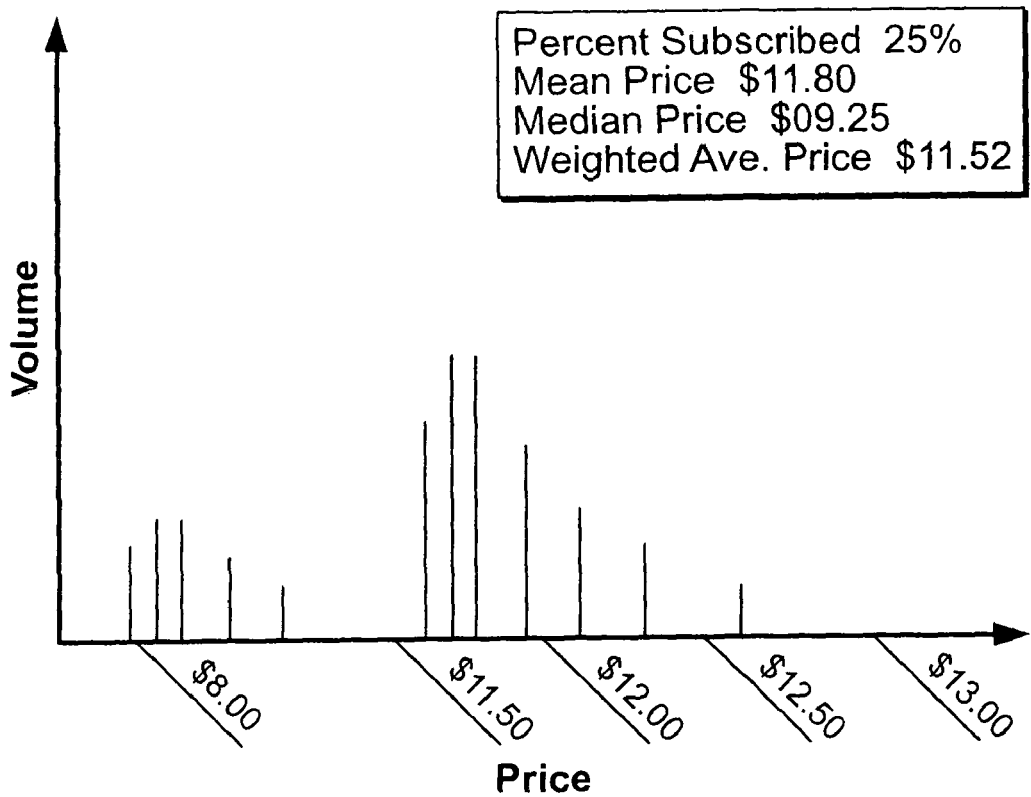
FIG. 12 shows a free-bid display example and some initial requests and supporting tabular Bidstream summary statistics.

Another example shows such embodiments. For instance, in the free-bid example shown in FIG. 12, the Participants begin with a series of requests in the $11.50-$12.00/share range. Some Participants can even try to low-bid the system by placing some requests down in the $8.00/share range. A summary table (upper left in FIG. 12) of Bidstream distribution statistics tracks the building of the Bidstream in real-time to assist a Participant's visual perception in analyzing Bidstream behavior.

Figure 13:
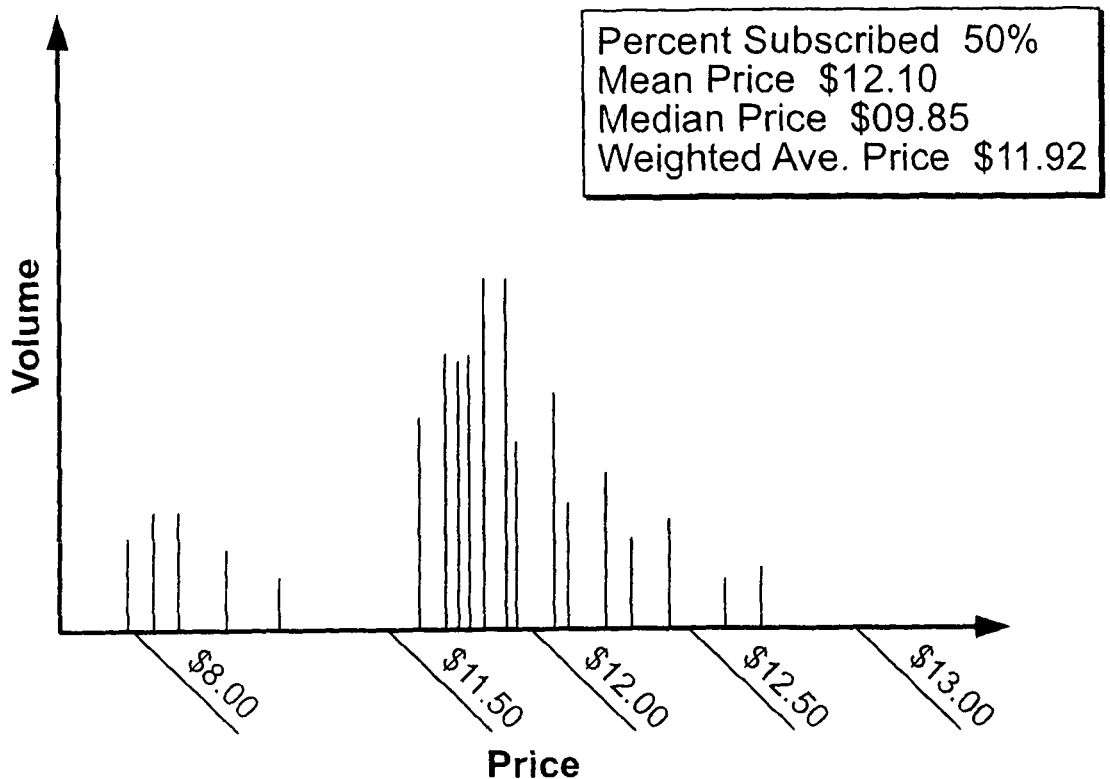
FIG. 13 shows graphically how new Participants place a range of Reservation Rights requests at a higher range and the changing supporting tabular Bidstream summary statistics.

By analyzing the previous graphic distribution of emerging demand and relying on real-time Bidstream summary statistics, new Participants might place a range of Reservation Rights requests at a slightly higher range (FIG. 13). Note that the Bidstream summary statistics table continues to track the emerging demand behavior. This forms the basis for an information cascade, where the actions of early Participants are made available to, and might thereby influence and alter the behavior of, subsequent Participants. This shows the mitigation of any pre-existing asymmetry of information in action. Since all Bidstream behavior is transparent to all Participants, Reservation Right requests reflect any non-public or hidden information, and the pre-market as a whole can choose to take this into account.

Figure 14:
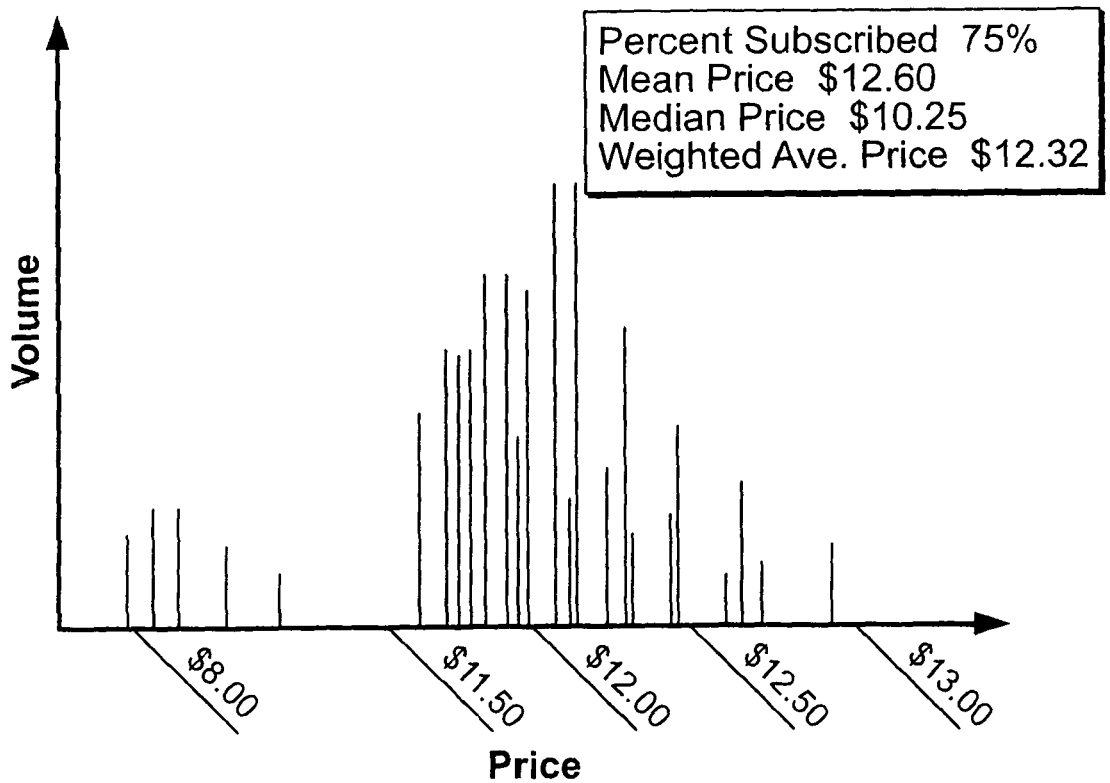
FIG. 14 shows further for the free-bid example the impact of pricing momentum.

FIG. 14 shows that, as more Reservation Rights requests are received, pricing momentum takes hold as the free-bid Bidstream begins to fill to the full subscription range. The initial distribution becomes more visible as the pre-market self-organizes. The tracking statistics show a narrowing between the mean and weighted average prices, indicating that initial demand is solidifying in the area of about $12.50/share.

Figure 15:
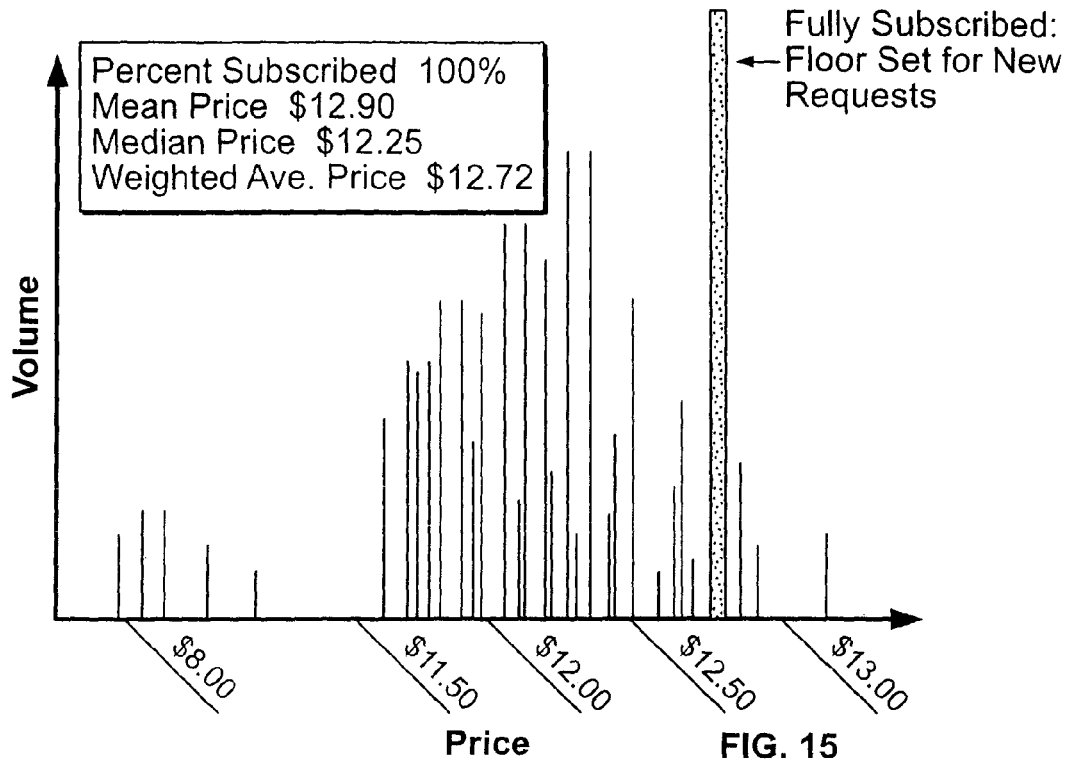
FIG. 15 shows further for the free-bid example what happens when the Bidstream reaches the full subscription point, that is all units subscribed, and a new threshold floor is set for accepting new Reservation Rights requests.
Figure 16:
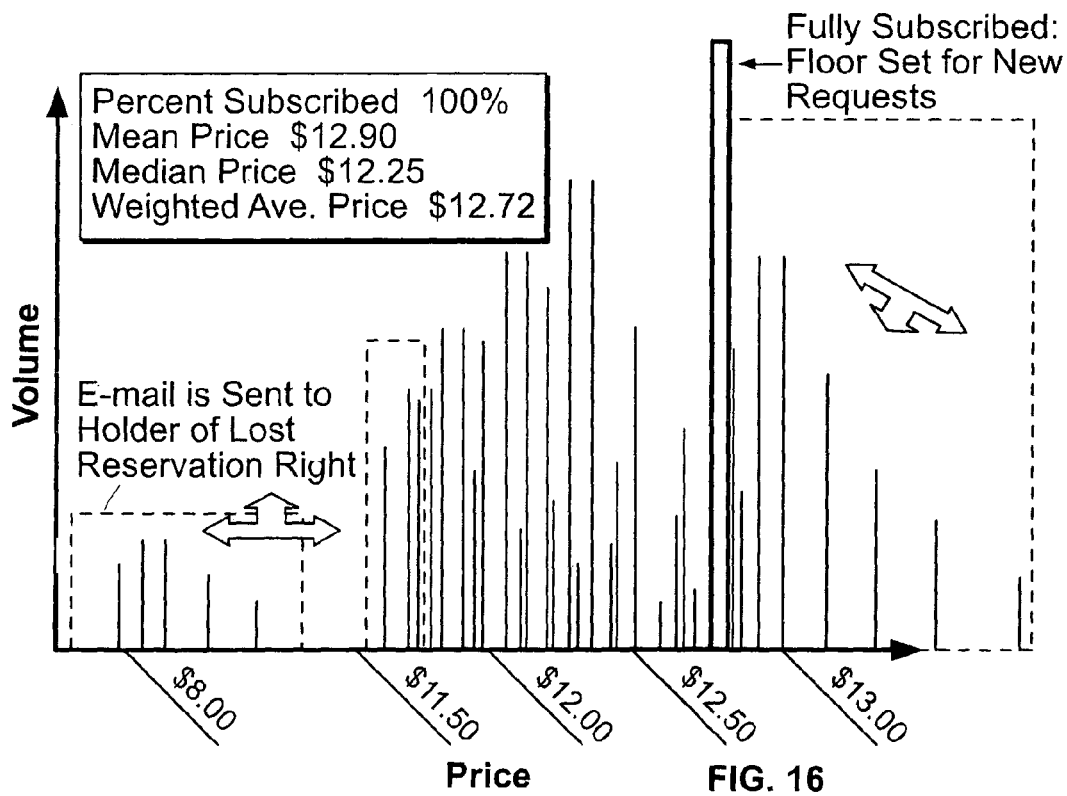
FIG. 16 shows following FIG. 15 what happens when newer Reservation Right requests are accepted and reserved above the threshold floor and lower bids are cancelled.

In FIG. 15, the free-bid Bidstream eventually reaches the full subscription point. Since there is no fixed, geometric distribution to reset, the underwriter must choose a method for setting a floor for new oversubscription Reservation Rights requests. In this case, to move the Bidstream forward in search of the true demand, the Issuer Group chooses the weighted average over the mean. As in any geometric Bidstream, while new oversubscription Reservation Rights requests are accepted and reserved above the threshold set by the Issuer Group, the lowest priced Reservation Rights requests are cancelled and the holders of those rights are notified. In this case, all Participants requesting in the $8.00/share price point range are canceled, as well as those on up to $11.70/share (FIG. 16). The Bidstream resets continuously as additional Reservation Rights requests are made, moving upward and eventually discovering the accurate and true reflection of demand.

As in other embodiments, additional features can be implemented in the free-bid embodiments to conform with applicable legal, regulatory, and contractual requirements, and at the discretion of the Issuer Group, including (but not limited to): (1) e-mail notification of the status of the Participant's Reservation Rights that are currently valid; (2) e-mail notification of the cancellation of any Reservation Right requests; (3) statistical and graphical feedback of the current status of the Bidstream building process; and (4) disclosure of any set-aside arrangements and their current status (see Set-asides below).

Stratified Bidstream

There are similar problems with current approaches to debt security offerings. The system advantages apply to equity offerings, as well as debt (bonds, notes, commercial paper, etc.) offerings. This is true whether the bond (i.e., debt instrument) is corporate, sovereign, sub-sovereign, public, or municipal in its origination.

Unlike equity IPOs in the U.S., there is no regulation requiring offering the anticipated debt securities at only one price (or yield, in this case). Thus, one can use a stratified Bidstream embodiment with a set number of yields (i.e., coupons) available. Since the system automates much of the offering process, little additional effort is needed to offer a limited number of yields, and thus only a few sets of associated Indenture Agreements or Official Statements (or similar debt offering agreement). Alternatively, the system can offer discriminatory pricing related to one Indenture Agreement of Official Statement. For ease of comparison, the price equivalent of yield (i.e., discount/premium from par) value can be used and displayed on the Demand Display and the Participant could toggle back and forth between the two alternate views of debt pricing.

Figure 17:
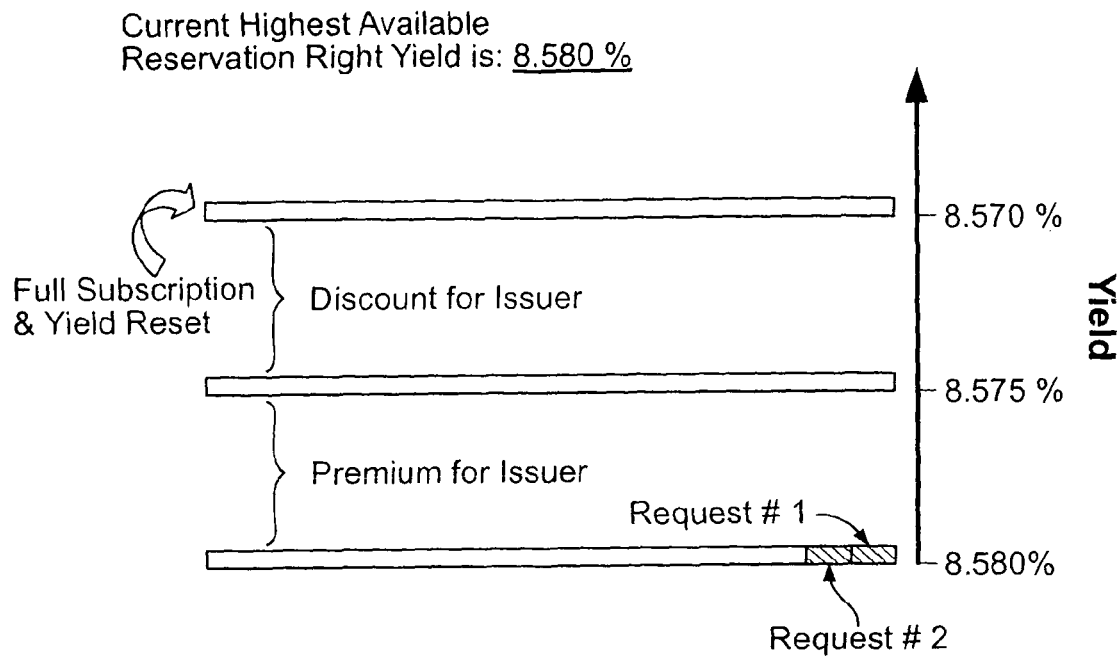
FIG. 17 shows for a stratified Bidstream example encouragement of demand for price discovery of lower yields of a bond issue.

Since Reservation Rights requests made earlier might end up with higher yields (hence a lower price or greater discount), Participants are encouraged to indicate their interest earlier. This approach both builds the Bidstream and discovers demand for lower yields for the benefit of the bond issuer. FIG. 17 illustrates one such embodiment, where the Issuer Group might issue and register three series of bonds, coupons, and bond documentation sets (Indenture Agreement, Official Statement, etc.), as opposed to hundreds or thousands of documents that could conceivably be required under different, continuous geometric and/or geometric build embodiments. Alternatively, the Issuer Group can choose to issue one series of bonds, coupons, and bond documentation, and conduct the actual sales of the bonds at different discounts/premiums that reflect successful positioning of the Participants in the Bidstream. The stratification of a limited number of pricing and/or yield points would also simplify any secondary market trading, potentially homogenizing the after-market.

As with a continuous set of BidBlocks for an equity offering, a debt offering is made up of a limited number of BidBlocks allotted at specific yield basis points. But in this case, the Participant will end up paying what he bids, rather than a calculated mean or median of all bids. As a result, the Participant would have an additional advantage in variable-priced debt offerings when acquiring and retaining the early Reservation Rights request BidBlocks.

Like the price range in an equity Bidstream, an initial yield spread is set by the Issuer Group. In the example of a high-yield corporate bond offering (FIG. 17), the Bidstream is stratified to reflect the terms of a set number (in this case, three) of bonds, coupons, and bond documentation, or to reflect three different pricing point discounts/premiums from par for one bond, coupon, and bond agreement. As in the equity Bidstream examples, Participants access the system, review the current Bidstream offerings that meet their portfolio objectives, and make their requests.

Figure 18:
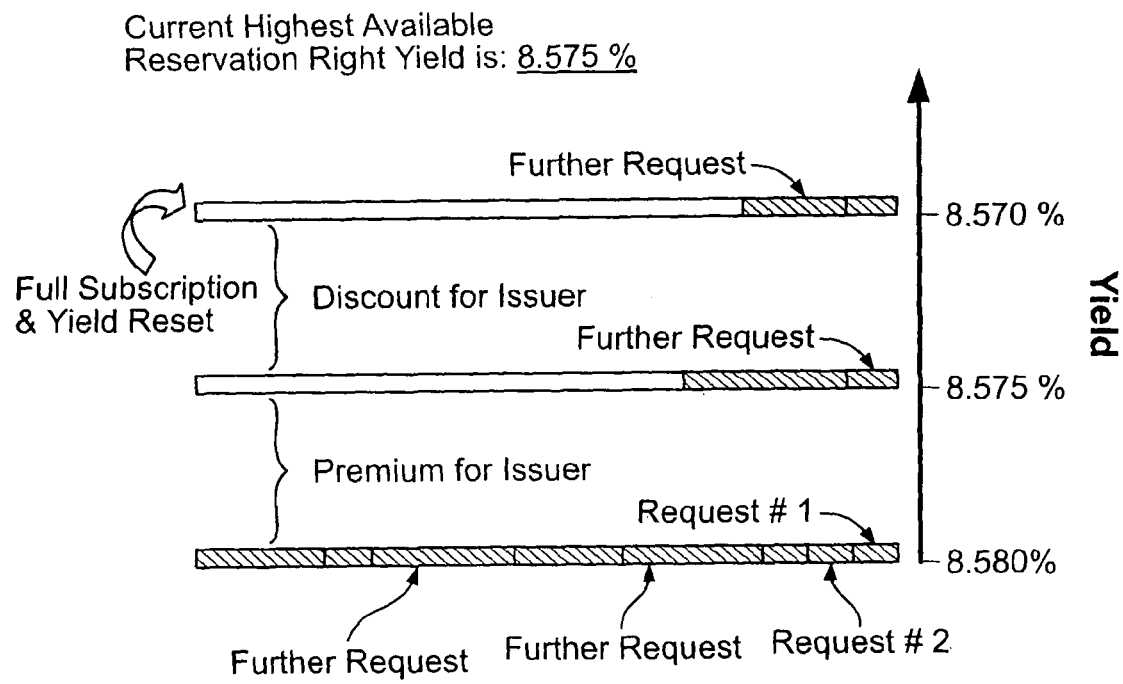
FIG. 18 shows the stratified Bidstream for a bond issue at the price of highest yield or spread over a portfolio of Reservation Right request.
Figure 19:
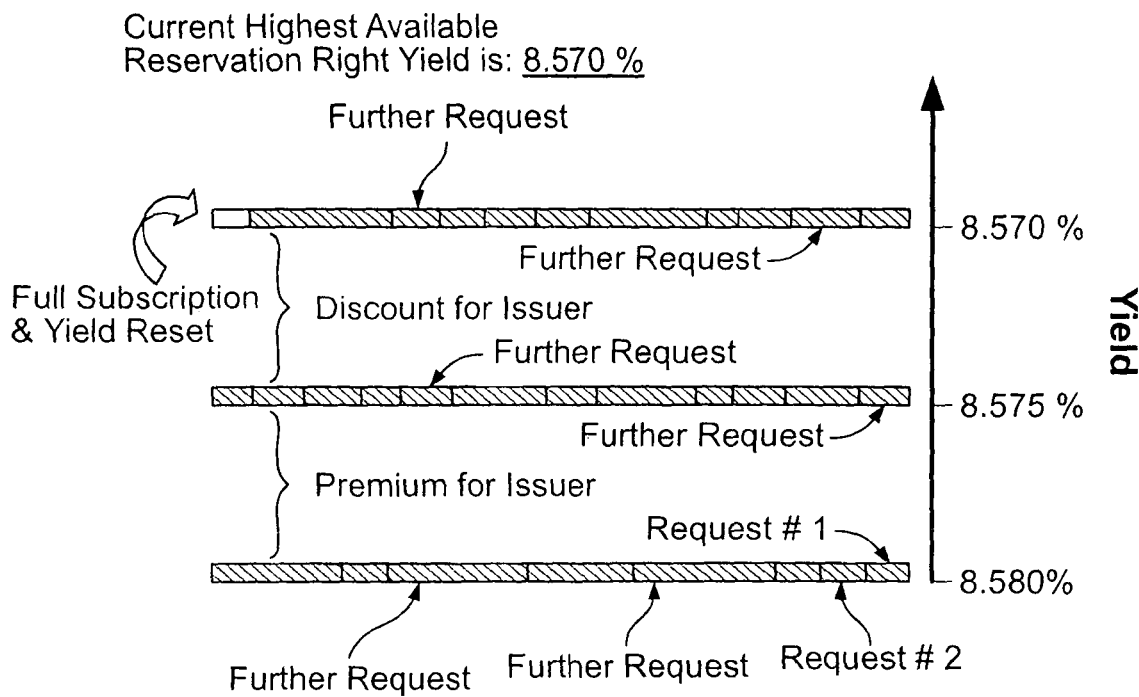
FIG. 19 shows for a bond offering what happens when the Bidstream approaches the full subscription point.
Figure 20:
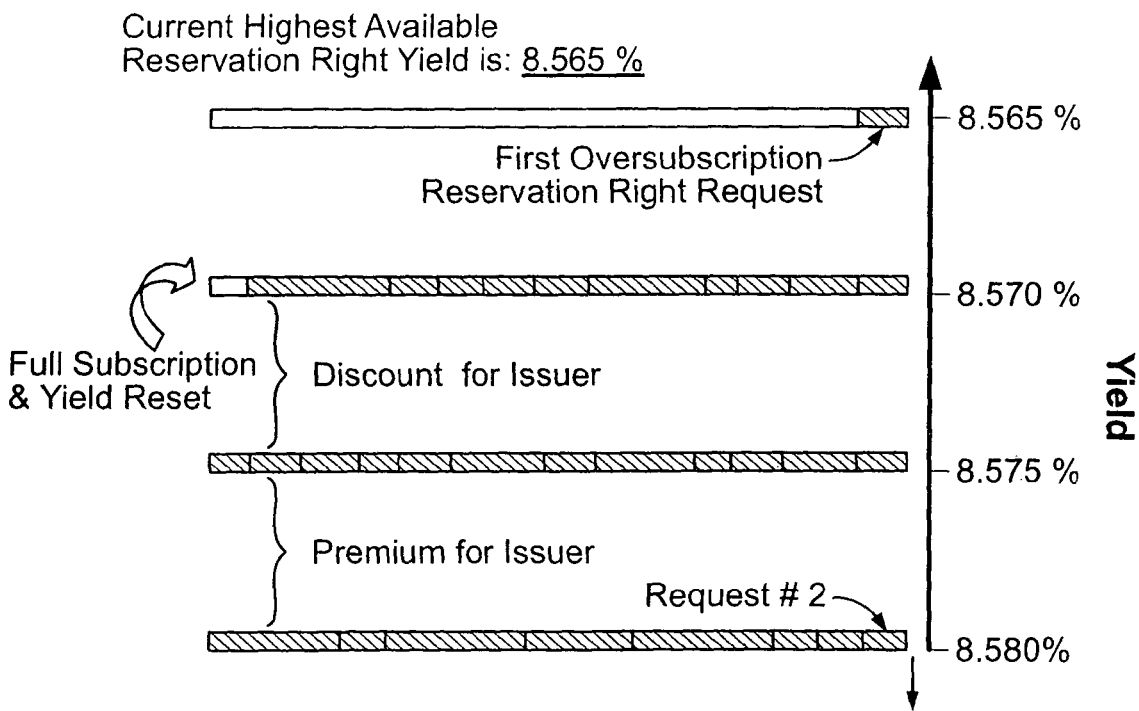
FIG. 20 shows what happens when the full subscription is reached and the demand is reset to add more Reservation Right BidBlocks at lower yield.

As with continuous Bidstreams, Participants can build stratified Bidstreams at the price of the highest yield, or spread their requests over a portfolio of yield Reservation Right requests (FIG. 18). And as the example high-yield bond offering Bidstream approaches full subscription, the System prepares to reset (FIG. 19). As the last initial Reservation Right request is accepted and reserved, full subscription is reached, the Demand Display resets, and more Reservation Rights BidBlocks are made available at an even lower yield of 8565% as a buffer (FIG. 20). As new lower yield requests are accepted and registered, an equivalent number of Reservation Rights are canceled at the highest yield, and notification is sent to the holder of the lost Reservation Right request. The stratified Bidstream for this example of a high-yield bond continues to build, and will continue discovering the lowest yield for the bond issuer, until demand for the issue is exhausted and/or the Bidstream is closed.

Figure 21:
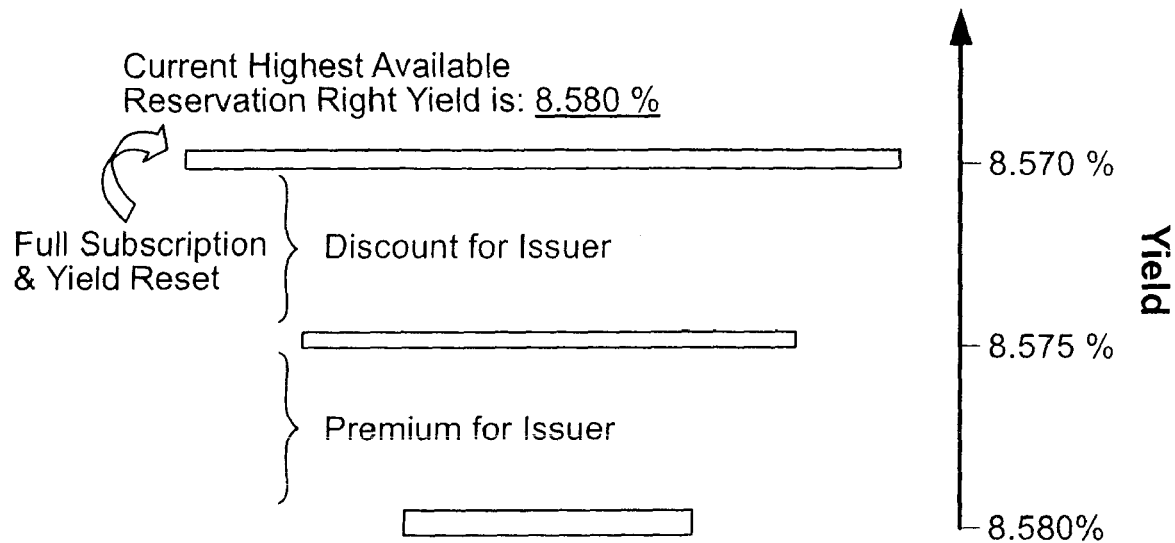
FIG. 21 shows for a debt issuance how stratified Bidstreams can be shaped with less higher yield BidBlocks to encourage earlier information production.

Similar to the display of multiple Bidstreams for equities, new debt issuances and asset embodiments can be enhanced by using multiple displays and/or split screens to display the Bidstream building of multiple maturities (i.e., serial bonds and/or term bonds with multiple maturities of the same debt issue) or multiple asset sales, and/or to compare the Bidstream building of multiple debt issuers and/or asset sellers of the same (or different) credit ratings and/or presumed quality. Like geometric continuous Bidstreams, stratified Bidstreams can be shaped with fewer higher yield BidBlocks to encourage earlier information production (FIG. 21).

Dual Bidstreams and Set Asides

In other embodiments having dual Bidstreams, a block of the securities and/or assets, or units of goods/services that might be excluded from the total amount of the securities and/or assets, or units of goods/services offered to the general Participants (herein called a public pool block), but which might eventually be offered. These can be disclosed (or not), and displayed (or not), based on the strategy chosen by the Issuer Group, and on the disclosure requirements of the appropriate legal, regulatory, and contractual jurisdictions. One example is the so-called friends and family securities blocks set aside in equities underwriting, something of a tradition in IPO offerings in the United States. Another example of this set-aside practice can be BidBlocks set aside for the underwriter syndicate (e.g., through an overallotment; or in investment parlance, Green Shoe option), and/or any institutional investor BidBlocks set aside within confines of the applicable legal and regulatory conventions. Alternative scenarios for using a dual Bidstream embodiment can include offering two classes of stock, or even a hybrid offering of equity and debt, but are not so limited.

Figure 22:
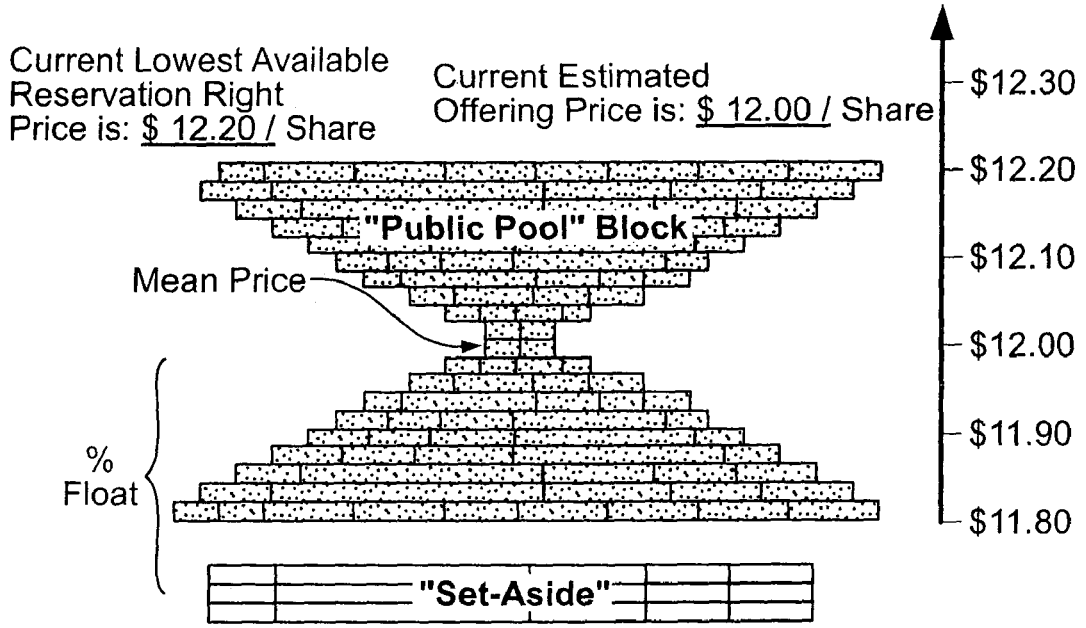
FIG. 22 shows a set aside block of units on a Demand Display of a current Bidstream.

Based on the legal, regulatory, and contractual requirements of the applicable jurisdictions, this set-aside can be disclosed in the prospectus. Based on the strategy of the Issuer Group, the set-aside BidBlocks can also be displayed on the same Demand Display screen as the display of the current Bidstream for the public pool BidBlocks (FIG. 22), or on a different screen or display to inform Participants of total commitments to the offering.

Using a dual Bidstream embodiment, the pricing of such set-aside blocks can be at a fixed price and quantity of units, or at a float based on a spread and/or discount from the projected offering price (or other similar quantitative measures or metrics). If the set-aside block floats, the system can make adjustments in at least three ways, including but not limited to: (1) the projected offering price to set-aside reservation holders can float and be calculated upon a predetermined, fixed number of reservations; (2) as in the fixed monetary requests made by individual Participants and/or their agents, the number of reservations allowed for set-aside reservation holders can be made on a fixed monetary value, and the number of reservations can be adjusted by an embodiment based on the equivalent value of any spread and/or discount off the float of the projected offering price/yield; and (3) a hybrid of the two methods above can be implemented where some set-aside reservation holders have a fixed number of reservations with a floating price/yield, and when other set-aside reservation holders have a fixed monetary reservation where the number of Reservation Rights are adjusted, based on the equivalent value of any discount off the float of the projected offering price/yield.

If the set-aside block floats with the Bidstream, the Issuer Group/Seller must determine whether this set-aside is for a fixed amount of units or for a fixed monetary value. Like any other Bidstream, when the Bidstream reaches full subscription, the system will continue to reset to a higher price range as long as there is ongoing demand—in due course, discovering the true price.

Set-aside reservation holders can, likewise, be notified of any changes to their own allocation position or to the status of the general Reservation Rights Demand Display, and to any associated statistical measures. This might encourage set-aside Participants to participate in the general Reservation Right public pool (in addition to any rights they might previously have as the result of set-aside arrangements), particularly if there limitation of a fixed number of set-aside reservations or there are reductions in the number of Reservation Rights in the set-aside BidBlocks because of the equivalent value of any discount off the changing float of the projected offering price.

Figure 23:
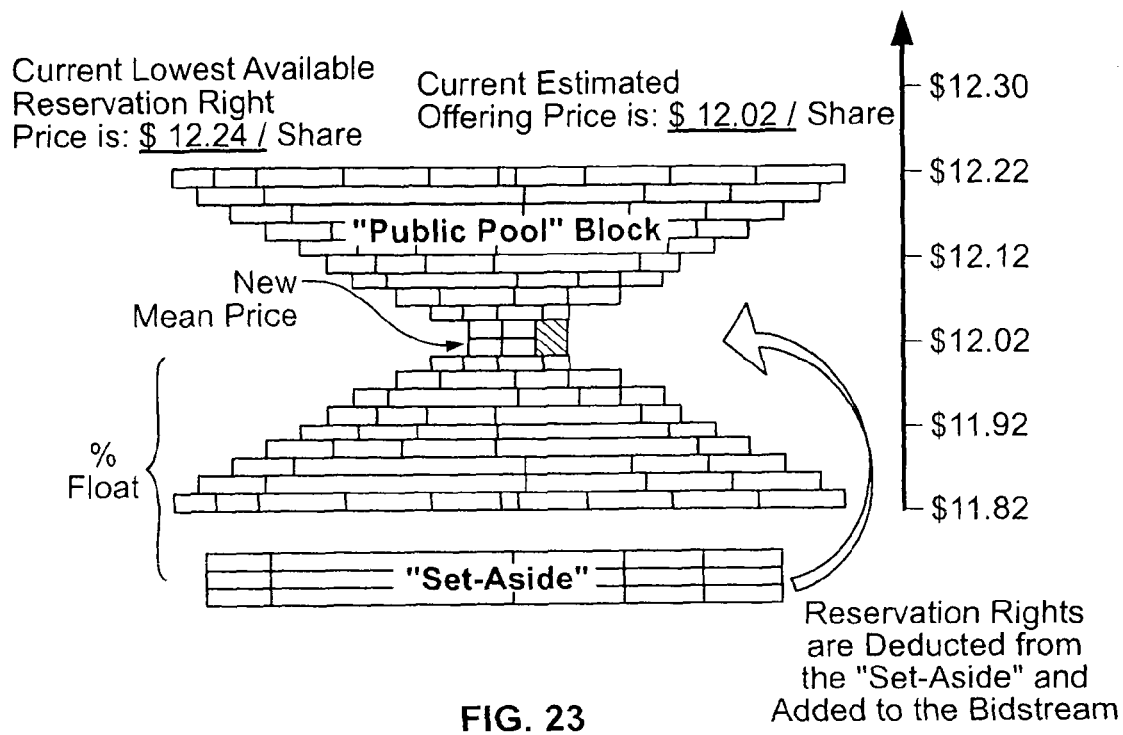
FIG. 23 shows how in a dual Bidstream with a fixed monetary set-aside float, a set of units is cancelled from the set-aside and added to the public pool as the price range rises and moved the float in conjunction.

In any case, where there is a reduction in the number of Reservation Rights in the set-aside BidBlock, these freed-up units might or might not be used to supplement the number of Reservation Rights units available to the public pool BidBlock section of the Bidstream. They can be added at a statistical point (e.g., the mean, median, some weighted measurement, etc.), or at the highest current price/lowest yield, or put into the overallotment pool and/or some other insertion point chosen by the Issuer Group. See FIG. 23 for one such example.

Leveling the Playing Field

There exists the probability that different individuals and organizations will work with varying qualitative degrees of pre-offering or pre-sales information gleaned from both public and private research and from other sources of information. One advantage of the present system is that it displays the real-time building of the Bidstream as a reflection of the demand generated by this asymmetric distribution of information. In effect, by combining and homogenizing the resulting reflection of such asymmetric information (i.e., the display of all Reservation Rights), the system diminishes the relative advantages of those Participants with access to non-public information over those without such access who are at a relative disadvantage. The system accomplishes this by equitably merging or mixing the results (i.e., demand) of information of varying quality from different sources, thus greatly reducing, if not entirely eliminating, some of the relative advantages and disadvantages of Participants with and without access to apparently superior information (whether or not that information was obtained ethically and legally). However, it is recognized that those Participants holding superior information might retain some advantage of making earlier Reservation Rights requests, retaining a higher probability of achieving their desired price and allotment positions.

The following example demonstrates this benefit of reducing asymmetry. In one embodiment, an Issuer Group/Seller and/or Operator provides to the Participant or his agent a graphic representation of a fixed number of Reservation Rights for the upcoming units to be offered over a data network such as the Internet. The fixed number of Reservation Rights range, at a per Reservation Right price, from a lowest price point reservation BidBlock to a highest price point reservation BidBlock.

This Bidstream can be represented graphically by an easily understood geometric shape reflective of the underlying price discovery behavior (i.e., the emerging pre-market). This is of particular importance and value to: the less sophisticated potential investor/buyer who might be disadvantaged by not having the day-to-day experience of dealing with professional trading systems based purely on numeric-data displays on computer screens (as compared to the more experienced investor/buyer); the potential investor/buyer might also be at a disadvantage due to of the asymmetry of information resulting from selective disclosure; and/or the potential investor/buyer who might find the cost of information production prohibitive outside of the registration materials, prospectuses, or sales materials. The Participant requests at least one of the fixed numbers of Reservation Rights BidBlocks by submitting a request for that Reservation Right at a Reservation Right request price point. If the request meets the suitability criteria (i.e., investor/buyer suitability profile, credit limits, etc.) of the Issuer Group/Seller and any monetary and/or volume limits set by the Issuer Group/Seller, the request is accepted and registered by the system's Bidstream database module. Likewise, if the request fails to meet any of the Issuer Group/Seller criteria, the system can interact with the Participant to align the request in line with the system's current criteria. For example, if a Participant makes a unit quantity request for more units at a given price point than are remaining in the Bidstream at that price point, the Participant might be offered what units are still available at that price point, and would be asked if they wish to continue making additional requests. Similarly, if a Participant makes a request that exceeds his credit limit set by the Issuer Group/Seller, the system can interact with the Participant to align the request with criteria acceptable to the Issuer Group/Seller.

As successive requests are accepted and registered, all system users including the Issuer Group/Seller, the Operator, and the Participants can monitor the graphic representation of all accepted and registered requests. The System can use different colors to represent accepted and registered requests and/or empty request BidBlocks (i.e., reservation BidBlocks still available in the Bidstream). Subsequent requests for Reservation Rights would be accepted and registered in the Bidstream database module only when the Reservation Right request price point is the same as or higher than the Reservation Right price of the lowest price point Reservation Right allocation BidBlock remaining available. Likewise, quantity requests at that lowest price point are limited to the quantity of BidBlock units remaining available within the BidBlock unit quantity limits set by the Issuer Group/Seller in a given embodiment chosen by the Issuer Group/Seller.

In this embodiment, the system would give Participants visual feedback of their positions in the Bidstream, based upon the unit quantity and price of the Reservation Rights successfully accepted and registered and those units still remaining available in the Bidstream. This monitoring function can be accomplished by requiring Participants, or agents monitoring their clients' positions in the Bidstream, to log on for authorized access to such feedback or, alternatively, this function can be implemented through an Internet cookie system.

In this embodiment, tables, charts, or graphs can augment a graphic and/or geometric representation of the Bidstream; and/or as the Bidstream is formed, the system can provide overlays depicting statistical reflections of market demand (e.g., current mean, median, and weighted averages, volume over time, etc.). In both regular and oversubscription modes, the same tables, charts, graphs, and overlays might also display the velocity of demand as reflected by changes in price-setting momentum, thereby further assisting individuals who might be relatively disadvantaged due to an asymmetry of information about the emerging behavior of a Bidstream.

When the number of requests for Reservation Rights is greater than the fixed number of Rights set by the Issuer Group/Seller, one or more lowest price point Reservation Rights are removed from the fixed number of Reservation Rights in order to maintain a fixed number of Reservation Rights or a desired amount of proceeds from the offering and/or sale, thus leaving a remaining number of successfully accepted and registered Reservation Rights. As previously mentioned, system Implementers can choose to rescind and/or cancel lowest price point units in the reverse order in which they were accepted at a given price point, in order to reward the information provided by Participants who committed earlier at that price point. In this embodiment, overallocation rights can be used as a leveling mechanism and/or buffer for a number of purposes, namely; to extend the fixed number of Reservation Rights BidBlocks as needed (e.g., as Reservation Rights are added and/or removed during pricing resets to maintain geometric consistency); to interact with changing set-aside pools, and/or as a reward for relevant information production. See Rewards for Information Production below.

In this embodiment, the Participant losing his Reservation Right can be notified and can choose to re-request. Then, at a predetermined closing date and time, the remaining number of Reservation Rights, which have been requested by the Participant and remain successfully accepted and registered in the Bidstream, are subsequently offered to that potential investor/buyer by the Issuer Group/Seller at that Reservation Right request price, according to the securities or contractual rules and regulations of the applicable legal jurisdiction.

In some embodiments, the actual sale of securities, or assets, or units of goods/services might be offered to the Participant based on a formula related to the final pricing points of all Reservation Rights. Previously mentioned examples include the arithmetic pricing mean, the arithmetic pricing median, a weighted average price, etc., but are not so limited. However, the reduction of the asymmetry of information places the Participant at less of a relative disadvantage than he would be under the existing processes for book building or building a sales order book.

Rewards for Information Production

Embodiments accommodate both pooling and separating signaling theoretical models (assuming that a given implementation embodiment is compliant with the applicable regulatory, contractual, judicial, and legislative requirements). In some sense, all signaling models have the same underlying structure. Under certain conditions well-informed players can improve their market outcome by "signaling" their private information to those who know less. A pooling equilibrium is an equilibrium in which all types of sender send the same message. A separating equilibrium is an equilibrium in which all types of sender send different messages. In general, a system is said to be in a state of equilibrium if all influences on the system are cancelled by the effects of others. In some embodiments, all Reservation Requests are blind—i.e., the source of the signal of value is seen by all, but is not identified as to its source (called here "pooling" signaling). In other embodiments, the source of the Reservation Request is identified or can be optionally identified if it exceeds a specific threshold number of Reservation Requests or their aggregate quantity and/or equivalent monetary value—resulting in a separating signaling. For a separating equilibrium to exist there must be signaling costs that differ across groups. These two signaling conditions form what is called in economics the single-crossing property. Arguably, in a new issuance, different groups incur different signaling costs.

In the case of a separating signaling equilibrium, certain embodiments contain a mechanism for reaping the benefit of costly signaling. This disclosure also addresses the problem of enticing and rewarding quality signaling of interest earlier in time in the Bidstream building process, as discussed above.

Underwriter syndicates and their broker-dealer networks enjoy the additional advantage of having a better overview of deal flow, thus enabling them to advise their clients about new issuances in which to participate, and about what Reservation Right strategy to employ to achieve the best overall portfolio results. For example, underwriters and institutional investors might know more than an issuer about the prospects for the company's competitors, or about the economy as a whole. Also, because they are exposed to the flow of deals (e.g., IPOs, debt floatations, etc.) on a continuous basis, underwriters and institutional investors are likely to know more about the strength of the deal market pipeline in general, or about deals by similar companies already in the pipeline. And finally, even a less well-informed investor knows something the issuer doesn't know: i.e., the investor's own particular demand for the price yield/volume of the new issuance.

Why would potential investors be willing to reveal important information, especially when it is positive? Information production and sharing occurs because of the transparency incorporated into the system, where withholding positive information might also result in little or no allocation and/or a less advantageous pricing in the actual sale of the security, asset, or units of goods/services.

Information Cascades

As previously mentioned, price discovery raises a problem in the prior art of book building and building a sales order book processes for the Issuer Group/Seller: namely, that potential investors and/or buyers might have incentives to withhold information regarding unit demand at given price points if they suspect that the information will be used to their disadvantage. The problem is likely to be particularly acute in cases where: (1) the information is costly to acquire; and/or (2) the information, if revealed, would lead to a revision of the eventual sales price.

This conundrum leads to embodiments where early providers of information (i.e., Reservation Rights requests) are rewarded for their signaling of any imputed valuation analysis. The system can reward early requestors—Participants who provide earlier signaling and production of information concerning both pricing and allocation demand. For example, rewards might be accomplished using methods specific to a given Bidstream, including (but not limited to): (1) the geometric shape (e.g., where there are more unit allocations for Requests made earlier, that is, at the bottom of the Bidstream (i.e., a pyramid shape, etc.); and/or (2) a weighted formula, used as an alternative way to discount and/or increase the unit allocation to earlier Requests.

In addition, where legal, regulatory, and contractual jurisdictions allow some form of discounting, and/or do not enforce one-price-for-all methodologies, embodiments can be tailored to compensate quality signaling (e.g., earlier and larger block requests, disclosure of the identity of sophisticated investors, etc.). This compensation or reward might be in the form of a discount, or some other fully disclosed reward. Quality signaling rewards might be fixed, or might float based on a spread from some other measurement (e.g., final offering price, weighted averages, etc.). In the case of the U.S. example, this is already possible in new debt issuances, where two or more indenture agreements might be created to encourage those requesting Reservation Rights to signal their interest sooner in order, to get a higher yield or the final sales price offered might vary as a discount/premium from par.

Moreover, where legal, regulatory, and contractual jurisdictions allow allocation discretion, the system would embody the results of information cascades—rewarding Participants providing earlier signaling information through earlier requests with greater allocations on some predetermined basis. Information cascades would happen when potential investors/buyers make sequentially timed decisions concerning indications of interest (i.e., later Participants might condition their interest based on the growth, volume, and pricing momentum of previous requests for Reservation Rights), with demand either snowballing or remaining low over time. In manual book-building or building a sales order book, information cascades are difficult to develop unless the Issuer Group/Seller divulges privileged information, because the Issuer Group/Seller is usually obligated to keep such information secret or, at least, not to release it selectively. In the present system, information cascades would easily develop because all Participants can transparently view the accepted and registered Reservation Rights of all other Participants. Hence, the system is more likely to motivate additional actions that would not otherwise occur without this inherent transparency.

For instance, based on the amount of time remaining to closing of the Bidstream formation, the earlier Participants could be offered a portion of the overallocation allotment or additional rights, on a sliding scale. This signaling reward might take many forms including but not limited to: (1) additional Reservation Rights at the time of the new issuance and/or sale of units (e.g., a portion of the Green Shoe in investment parlance overallotment provision); (2) selective use of option units (for example, options to Participants who request Reservation Rights above a certain monetary or volume block size); (3) an additional right in the form of post-issuance options; and/or (4) selective post-issuance pricing support.

Furthermore, this incentive for the production of quality information can be coupled with, or decoupled from, eventual positions in the Bidstream when the building processes close. To further elaborate, rewards for information production can be limited to the number of units of a given Participant that successfully remain in the Bidstream, or information production rewards might still be available even when the Bidstream closes, and even if the Participant has no remaining successful accepted and registered requests for Reservation Rights. Where such variations exist, this disclosure proposes that the rules should be kept relatively straightforward, should be disclosed and easy to understand, and should be included and updated in and through any scheduled communications and/or updates of graphic and/or textual feedback of a given Participant's position.

Status Notifications and Document Delivery

In one embodiment, those Participants losing a Reservation Right are notified and the Participant (or their agent) can decide whether to re-request, and at what unit volume, given the visual and statistical reflection of market demand and rate of change of demand as reflected by changes in price/yield setting momentum.

The notification of Participants by e-mail need not be limited to cases where the requested Reservation Rights have been rescinded or cancelled. Operators of the system can offer the capability of Participant-defined periodic updates (e.g., a graphic presentation snapshot of the Bidstream and the Participant's positions of reservation relative to the entire Bidstream, or a statistical report of significant metrics, and/or an oral report automated to leave relevant information on an electronic [e-mail, facsimile, SMS, wireless PDA] and/or voice channel [voice-mail, cell phone, etc.]), to be e-mailed or voice-mailed during the course of building the Bidstream. For instance, an Operator can offer, and a Participant can choose to accept, updates on a time basis (e.g., monthly, weekly, daily, hourly, or by minute).

Embodiments can also offer this reporting in a changing mode selected by the Issuer Group, and/or by the Participants themselves, where the time periods differ. For example, in a one-month Bidstream build, the Participant can choose weekly notification for the first two weeks, daily notification for the next ten days, hourly notification for the next three and three quarter days, and minute-based updates in the last 6 hours. These notifications can be available twenty-four hours a day, or set to a clock that is calibrated to the Participant's time zone and work/sleep patterns.

The system's automated e-mail capabilities can also be used to meet local regulatory and/or contractual requirements. This feature provides the means to: (1) qualify potential investors and/or buyers; (2) distribute electronic versions of registration statements, red herrings/preliminary prospectuses, Indenture Agreements, Official Statements, Sales Offers, Sales Contracts, etc.; (3) distribute any required prospectus and/or sales offer amendments (such as pricing amendments); (4) distribute confirmation of receipt of updates and amendments, and (5) notify the underwriter syndicate and its broker-dealers (or similar sales representatives in non-securities based applications) of individual conditions that might require manual processes (e.g., such as mailing a pricing amendment, confirming a Reservation Right, post-effective sales deliverables, etc), but are not so limited.

The system can also be used to deliver multi-media materials related to the anticipated offerings, registration statements, red herrings and prospectus materials, shelf offering materials, other new issuance secondary equity prospectuses, sovereign debt prospectuses, municipal bond red herrings and official statement materials, corporate bond red herrings, indenture statements, and other prospectus materials (for debt and/or convertible debt securities). The system can also provide offering materials for the securitization of assets or groups of assets, and/or additional information allowed under applicable securities and/or contractual laws and regulations. In the case of non-securities based applications, the system can provide multi-media materials and/or hyperlinks to those materials to provide additional information to those Participants in support of a sales order process.

In some embodiments, various multi-media materials can be provided and filed as part of the prospectus or as an appendix to the prospectus, including the script of any video as well as a fair and accurate narrative description of the graphic or image material.

Likewise, an Issuer Group/Seller might choose to further educate potential Participants by optionally showing them demonstration simulations of the rules in place for a given embodiment, before they actually participate in the building of a given Bidstream. These simulations can be also offered through the system as an optional general purpose investor/buyer-education module in a website, and/or as a specific simulation of the rules for a specific offering or sale, entirely segregated and associated only with the associated Bidstream to which it applies. These simulations might also be useful to a potential Participant in building or in using automated and/or program trading software agents to act within a given set of rules associated with the building of a particular Bidstream. See Automated Program Trading below.

System Overlays

Figure 24:
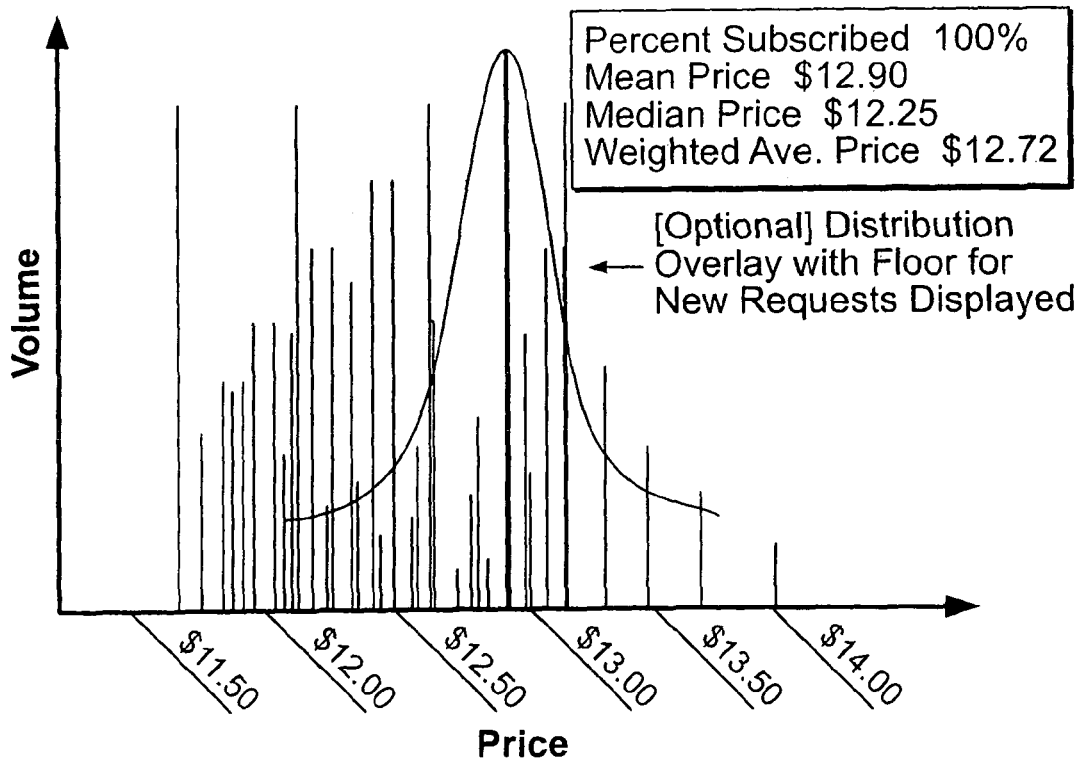
FIG. 24 shows a normalized Poisson overlay used to show the distribution of requests in a free-bid embodiment and to then set a threshold floor for oversubscription requests.

Various distribution curves can also be employed as display overlays (i.e., additional graphic elements) that allow the Issuer Group/Seller, Operator, and/or Participant to choose differing viewpoints of the overall Bidstream that might otherwise appear irregular or choppy, particularly in free-bid embodiments' Demand Displays. An example of this is displayed in FIG. 24, showing a Poisson distribution which normalizes the display of a variety of reservation requests in the free-bid embodiment. Other display overlays include but not are limited to:

1) historical overlay (for example, behavior of previous offerings with similar characteristics [e.g., an IPO in the same industry with earnings multiples factored in, previous pricing momentum curves based on similar Bidstream behavior, etc.]);
2) weighted overlays (e.g., showing retail investor Bidstream building behavior contrasted with institutional investor Bidstream building behavior, or showing behavior based on unit quantity request behavior, etc.);
3) large Reservation Rights quantity requests overlays (with Participant identities, if available);
4) oversubscription overlays;
5) price spread overlays;
6) price movement momentum overlays; and
7) Participant specific overlays e.g., current status, probability of remaining accepted [given current pricing momentum metrics], etc.),
8) scenario overlays (e.g., "what if" scenario overlays), and
9) game theory based overlays (e.g., those using competing and/or cooperating modeled outcomes, Nash equilibria, etc.).

Overlays can be: static in nature (e.g., a snapshot of the current status of a Bidstream with a historical, weighted, or price spread overlay); iterative (e.g., with an overlay being refreshed and showing additional delta information such as changes of pricing momentum); and/or with simulation based future projections (as in the case of "what if" scenario tools, and/or game theory-based simulations with various outcomes having different probabilities associated with them). The system can run iterative and/or simulation-based overlays in iterative loops, with the results being reported as input from the Bidstream changes, thus changing the input data and/or criteria.

Just as colors can be used on the Bidstream display by members of the Issuer Group and/or Seller to assist in their offering/sales decision making, the Participant can also be provided access to their own behavior overlays, with a preselected (or Participant-definable) color pallet to assign colors to various Bidstream behavior characteristics (e.g. spreads, pricing momentum, large Reservation Rights block requests if supplied with Participant identities, etc.).

In the case of new issuances of debt, bond, municipal bond, corporate bond, underwriting, portfolio, and/or other assets, additional useful overlays can be employed. These would include but are not be limited to past, present, and projected future: (1) U.S. Treasury yield-curves or other indexes (such as LIBOR); (2) spread from U.S. Treasuries or other indices; (3) yield-to-maturity; (4) yield-to-call; (5) yield-to-worst call; (6) commodity indices; (7) comparable asset portfolio pricing, and so on. These overlays can also be displayed in a time-series layout for new issuances and/or asset revenue/earning stream contracts, which might have a series of maturities and/or a series of terms. Overlays might also include comparable overlays of historical, current, and/or projected yield curves and/or spreads for similarly rated and/or similarly structured secondary market securities and/or assets.

Distribution curves can also be employed as safeguards to avoid statistical pumping in a free-bid embodiment—which might be desired by some of the beneficiaries of the result of the Bidstream building (for example, unusually highly-priced requests by an affiliate of the Issuer Group designed to skew the statistics higher than the bulk of the requests would otherwise indicate). One available distribution curve technique employs various distribution curves as a means of cutting off requests that have a set variance or statistical outlier from the boundaries of a chosen statistical distribution, and/or even rejecting Reservation Requests that are clearly outliers, thereby managing and maintaining stability in the orderly building of the Bidstream.

Finally, distribution curves can also be employed, in combination with the free-bid embodiments, in those legal, regulatory, or contractual jurisdictions that require the eventual offering and/or sales price to be uniform for all eventually anticipated offers or sales. The different distribution curve types can be used to display current projected sales price or projected price based on changing Bidstream criteria (e.g., price momentum, percent oversubscription, etc.)

Other Features

In graphic display embodiments, the displays can be color-coded with different colors used to signify different parts of the Bidstream (e.g., one color for unreserved Reservation Rights, a different color for the Participant's requested reserved positions, another color to indicate oversubscription mode, and so on. Furthermore, color overlays can be used by member of the Issuer Group/Seller to assign different and/or changing behavior in the Bidstream, as a means of effecting changes related to their strategic and tactical offering plans. These issues might include but not be limited to: (1) decisions on the handling of the overallotment options; (2) increase or decrease in marketing and/or sales efforts; (3) decisions on managing underwriter, syndicate member, or sales representative roles (if any) in after-market pricing support strategies and tactics, and so on.

In cases where the Bidstream is not built in a step function, tables can display the distribution of the Bidstream and give important statistical feedback on the pricing and distribution of the reserved BidBlocks (e.g., the mean, the median, weighted averages, etc.). The System can not only provide instantaneous feedback to the user, but can also give statistical and graphic representation of historical volume and pricing during the course of building and extending a specific Bidstream and/or multiple Bidstreams (representing multiple new issuances) or different aspects of a multi-part issuance (e.g., different maturities of a term series bond offering).

In some embodiments, two-dimensional information (graphic or otherwise) can be presented in various ways optionally, even configurable by the Participant, namely: vertically, horizontally, both views simultaneously, or both alternately. For instance, in a geometric graphic representation of the Bidstream, the price for equity, and/or debt, and or units of goods/services, and/or the yield for debt, can be displayed on one axis, and quantity on the other (either horizontally or vertically).

Furthermore, also contemplated is display of multi-dimensional information to the Participant. For instance, unit quantity can be displayed on the x-axis, price/yield on the y-axis, and time on the z-axis, allowing the Participant to view the building behavior of a Bidstream over time in three dimensions from any desired angle. Additional dimensions are not limited to time, and can include but are not limited to a variety of such quantitative and qualitative past, present, and/or projected future measurements (e.g., credit risk, portfolio considerations, secondary market behavior, projected financial analysis, and so on.

The identities of Participants requesting blocks of Reservation Rights can be optionally revealed on the computer display via a point-and click function, or in a separate tabular format. This can be done anonymously (e.g., showing only institution block investments with a different color coding), and/or explicitly (e.g., whereby specific references to institutional investors and/or to significant size requests are identified by name.

Another example shows how variations in the system might facilitate a Participant's desire to use a particular positioning strategy. This is demonstrated by affording individual Participants and/or their agents the optional selective freedom to make requests either in a fixed number of unit requests at a given price, or in terms of a fixed monetary amount. When a Participant first makes one or more requests for Reservation Rights, the system allows the Participant to request a fixed number of Reservation Rights at a given price, or to request a monetary amount, letting the system calculate the number of Reservation Rights currently available. The system might ask the Participant if it should place those reservations in the lowest price BidBlocks available, or alternatively spread them over a price range with the support of a multiple-request Reservation Rights BidBlock calculator. Such a calculator can be configured to interactively allow Participants to place multiple requests for Reservation Rights from a Participant-selected monetary amount, and receive feedback about the distribution of their requests and/or the balance of the requests at different request levels FIG. 5). Likewise, if the request is for a fixed monetary amount, then the System can adjust the number of requests for Reservation Rights according to the current status of the equivalent value (with respect to the changing and real-time adjustments), according to the formula chosen for arriving at the projected offering price.

The goal of maximizing the transparency of the Bidstream building process is to provide information feedback to all Participants in a non-discriminatory, real-time fashion. "Real-time" here is a relative term, and actually might be tuned or modified by those implementing the system. As used here, real-time refers to the time intervals (seconds, minutes) during which all requests are recalculated and set for re-display (i.e., the refresh process) from the Systems servers or from a similar information distribution point. Any delay from this refresh time resulting from private and/or public (e.g., Internet) network traffic and/or because of a Participant's network access speed, might create slight variants, which are inherent and to some degree expected in the electronic information distribution infrastructure. Nevertheless, the objective is to provide a truly level playing field with equitable, non-preferential, symmetrical, and near-simultaneous access for and to all interested Participants.

If relevant legal, regulatory, and/or contractual rules stipulate exactly equivalent delivery, particularly where program trading agents react faster than their human counterparts, then the system can be metered to deliver to all Participants at a least common denominator transmission speed acceptable to the appropriate regulators.

Implementers can choose to employ a database to ensure proper tracking of the regulatory requirements for both electronic and paper delivery, and to provide the reporting basis for any required actions by the members of the Issuer Group and/or sales representative of a Seller. The database component of the system also provides implementation of return-reply receipts via e-mail, as well as secure record keeping of access, downloads, and printing as further evidence of compliance with respect to the distribution of red herrings to broker-dealers, and the delivery of prospectuses to potential investors, pricing amendments, term sheets, or sales materials and pricing information (in the case of non-securities based applications), and so on.

Database features of various embodiments, combined with the systems automated e-mail features, can be implemented for such purposes of identification and/or qualification including but not limited to the following: (1) the suitability of investors/buyers; (2) qualified log-in; (3) managing Reservation Rights request monetary and unit volume limits; (4) delivery of required documents and/or notifications; (5) confirmation of deliveries of required documents and/or notifications; (6) compliance recording and tracking; and/or (7) delivery of any sales documents. These database features of various embodiments can also provide the basis for selected- and/or auto-generation of exception reports. These reports are electronic lists of interactions with a System embodiment that could identify situations that might trigger non-compliance with securities laws and regulations, and/or contractual obligations, and/or identify the need for manual action. The reports can also notify the appropriate party to initiate corrective action (automated or through backup manual processes) to facilitate proactive compliance with applicable local securities laws and regulations and/or contractual obligations.

Additionally, certain features can be combined in various ways with other features. For example, the notification option could be set to change from periodic updating if certain Bidstream behavior pattern parameters are exceeded (e.g., pricing momentum, price/yield presets, changes in market and/or economic conditions outside the specific Bidstream, changes in the Participant's other portfolio metrics, etc.). Then, any desired information update could be produced with Implementer-, Operator-, and/or Participant-selected color-coding and/or other overlays, and program trading agents can be manually or automatically activated to be able to respond to the changing conditions. This illustrative scenario is just one of many ways a system Implementer and/or Operator can offer and add value to the Bidstream building process, and by which a Participant can choose to combine different features in the system to tailor interactions to the individual Participant's needs and wishes.

Role of the Underwriter Syndicate

Under the present system, the underwriter/investment bank no longer need manage the book building process—the market itself can accomplish this equitably and fairly, mitigating the potential for abuse. The system still allows the underwriter syndicate and its associated broker-dealer network to add value through limited control of the design of the Bidstream (including setting initial price point ranges and any price/unit volume limitations) and optional control of visual feedback features, handling of overlays, handling of set-asides, handling of overallotment Green Shoe options, and so on. Even so, underwriters still have an essential and valuable role to play in advising new issuance candidates, gathering and organizing information about the issuing company for the prospectus, conducting due diligence, developing registration materials, and educating the public and potential investors about the company through the roadshow and other approved activities.

Furthermore, underwriter syndicates and associated broker-dealer networks would still play an essential role in the screening of Participants for suitability, both locally and globally, and in advising institutional and retail investors on their investment and portfolio strategy. And, perhaps most important, since most embodiments are focused on building the book and/or in collecting indications or interest, and do not include the actual offer or sale of the securities themselves and/or the securitization of assets, the underwriter syndicate and its associated broker-dealer network are necessary entities in offering, executing, and clearing any actual securities transactions and/or the securitization of assets, as well as providing any desired after-market support.

As more of the pricing and allocation abuse loopholes are closed, and underwriters cannot replace lost commissions resulting from so-called money left on the table with other gains from quid pro quo agreements and tie-ins, they might focus on maximizing the information provided to the public to insure that proceeds to the issuing company are maximized (thereby maximizing the underwriter's commissions)—finally honoring their true and represented fiduciary duty to both the issuer and to their own stakeholders (e.g., financial firm partners, owners, stockholders, etc.).

The system does not impede or preclude the creation of an underwriting syndicate prior to or during the waiting period (in the U.S. example, the period between the filing of the registration statement and its effectiveness). Syndicate members (e.g., other investment banks, retail securities organizations, large wire houses, and locally-based securities retailers) can still act as agents of the underwriter with respect to educating their clients. This process can be accomplished through distribution of red herrings and participation in any roadshows, and by serving as agents of both private individuals and institutions in arriving at and executing a strategy for placing Reservation Rights requests, and then monitoring their client's position in the Bidstream. Commissions on, or discounts off, the price of Reservation Rights can still be earned through the efforts of the syndicate when there is a resulting sales transaction, and such discounts or commissions can be disclosed in any final prospectus, pricing amendment, or term sheet as part of the agreement reached between the issuer and the lead underwriter.

In summary, the system is not necessarily meant to replace such actions and activities of the issuer, underwriter syndicate, and broker-dealers as, for example: due diligence; preparation of registration statements; disclosure obligations; prospectus and notice delivery obligations; general selling or promotion efforts; and/or securities sales activities. Embodiments are focused primarily on the fair and equitable optimization of new issuance pricing (price discovery) and allocation and/or the efficient securitization of assets. Aspects of various embodiments might also serve as the platform to automate and increase the efficiency of activities that are still the statutory responsibility of those respective parties.

Lastly, it should be noted that the underwriting industry is incurring an escalating exposure to criminal and civil penalties, and such liabilities might, in fact, exceed the total of any prospective underwriting fees and commissions. As an important side benefit to the underwriting industry, the system also reduces the opportunity for abuses in pricing and allocation, and thereby significantly mitigates the potential liabilities of the parties involved in the offer, sale, and distribution of new issuances.

Automated Program Trading

The present system can also provide computer-readable standardized versions of the Bidstream statistics through standardized system outputs (e.g., application programming interfaces), which allows Implementers, Operators, and licensed Participants in the system to build computer application software programs for program trading-like Bidstream monitoring, and for automated Reservation Request computer programs that act upon information received from the system.

Also contemplated is an embodiment by which program like trading allows System Participants to set parameters to initiate the automation of requests for the placement of Reservation Rights (and alternatives)—in essence, layering on the System methodologies. An example is the use of a computer-enabled algorithm (program) that sets desired price and volume commitments, and then adjusts the execution of Reservation Right requests based on those parameters, and/or on statistical feedback from the System e.g., change in price velocity over time.

Simulations and Video Games/Entertainment Embodiments

Some embodiments are directed to simulations and uses of the system for the purposes of such applications as: participant education, general business education, training, and video game and/or other entertainment modes. For example, Operators can offer a variety of simulations so that potential Participants can familiarize themselves with a given implementation, run simulations, and investigate various "what-if" scenarios.

As further illustration, business schools and other educational venues can use simulations with a variety of pre-loaded system behaviors and/or conditions designed to be interactive with the students. The financial services community can use embodiment variations to train their investment banking, research analyst, and trading professionals.

Likewise, the system can be embodied in simulations for the entertainment and possible education of the end-user (e.g., as a substantive video game). The game approach is particularly interesting and attractive where interactions with the entertainment system trigger a variety of simulations that might be pre-configured for single-user interaction or in group play. In the latter, the game would operate through simulations that react to the participation of multiple users and are based on formulas that can be randomly cycled, or based on a set of conditions that are disclosed (or not) to all of the players.

Non-Securities Offers/Sales

The system also allows potential sellers and buyers to participate in conditional or binding offers to sell, offers to buy, and/or in a collection of indications of interest of units of goods/services, all in a transparent, competitive, and equitable manner. Thus, the system can be used in many other situations where there might be a large number of units to be supplied, or where more competitive pricing is desirable, or where more transparent pricing is desirable, or where more iterative price discovery is desirable (i.e., where fair and efficient price discovery might be problematic), and/or in circumstances where fair and efficient allocation of the units to numerous potential buyers might be problematic. The system can also be used where supply is not fixed, but might be varied by the Issuer Group/Seller in response to the emerging demand and discovery of price. For instance, if the system discovers a more favorable price, the Issuer Group/Seller might choose to provide and/or produce more units of the item and dynamically increase the Reservation Rights allotment BidBlocks limits in response, thereby achieving a dynamic Bidstream. Further, when used for service or labor unit pricing and allotment, the system can add additional units while simultaneously compensating for the price of additional overtime charges and/or premiums.

There is potential for unique and novel compensation structures resulting from the building of a Bidstream. For example, some or all of the compensation to the system licensor and/or Operator would be based on the amount of change in the pricing range due to the oversubscription mode of the system (i.e. the commission could be based on the difference between the initial projected offering price and the offering price derived by the system as a result of its price discovery value-added mechanisms).

Various embodiments can be used in the securitization of assets, securitization of contractual rights, and/or the matching of the analysis and assessment of risk with the pricing of premiums requisite to underwrite and/or hedge that risk. Other embodiments can be used for the actual sales of units of goods and/or services. Examples include but are not limited to: 1) insurance underwriting (e.g., where the distribution of risk might be difficult to ascertain and to price); 2) real property (e.g., real estate lots, portfolios of property, asset-backed contracts or portfolios [i.e., a portfolio of mortgages]); 3) securitization of future revenue streams from contracts (e.g., the future proceeds from Intellectual Property [i.e., patents, trademarks, copyrights, etc.]); 4) revenues from works of art (video, music, etc.) and/or the earnings streams of entertainers and/or sports figures; 5) commodities (e.g., where the pricing and allocation of original production might be derivative and/or particularly competitive due to supply constraints [e.g., where the production run of a semi-conductor company like Intel is based on the derivative demand for products built by its chip buyers—the production run can be competitively priced and allocated by using a Bidstream where all chip buyers might see each other's demand], where there might be inconsistent quality and/or flow of supply that requires inspection and/or confirmation before a binding sale can be consummated, etc.)); 6) labor and/or other services (e.g., where allocation might vary with supply, where job confirmation is contingent on inspection and/or interview of the job candidates, etc.); 7) used real property (e.g., where there are a number of units to be divided in quantity lots of varying sizes, where final sales might be conditional upon satisfactory inspection, etc.); and 8) among many other uses.

Computer Aspects

The system utilizes the technological art of conventional electronic (digital) computing, computers, computer systems, and networks.

The devices contained in the computer systems associated with the system are typical of conventionally installed computer configurations, and are intended to represent a broad category of such computer components that are well known in the art. Thus, Intel-processor-based platforms can be used, but numerous other platforms will also suffice, such as: Macintosh-based and/or Unix/Linux-based platforms, platforms with different bus configurations, dumb clients, networked platforms, multi-processor platforms, other personal computers, workstations, mainframes, navigation systems, and the like. Software components would include but not be limited to: operating systems; software development environments (BEA, Web Sphere, etc.), viewing software, document management software, communication software; network software, network management software; customized applications; and maintenance/utilities software, among other applications.

One embodiment includes a computer program (software) that is a computer-readable medium/media with computer instructions stored in/on the medium/media, which can be used to program a computer to perform the method of various embodiments. The storage device can include but is not limited to: any type of disk, including floppy disks, optical disks, DVD, CD ROMs, magnetic optical disks, RAM, EPROM, EEPROM, magnetic or optical cards, or any type of media suitable for storing electronic instructions. Other storage components can include: mass storage devices including redundant and/or RAID storage setups, and file backup, restore devices, and disaster recovery services.

Other hardware components can include but are not limited to: servers; telecom and network components (e.g., routers, switches, etc.), security systems (e.g., firewalls), load balancers, and network infrastructure (e.g., LAN/WAN connections and cabling), among other components.

The computer instructions in the computer program noted above can be located in an electronic signal, transmitted over a data network, which performs the method of described embodiments when downloaded into a computer system. The computer instructions are in the form of data being transmitted over a data network. In some embodiments, computer instructions are transmitted in electronic signals through cable, wireless, and/or satellite, or by other means of transmission now known or yet to be discovered.

Stored on any one of an array of computer-readable media, various embodiments include the software for controlling the hardware of the general purpose and/or specialized computer or microprocessor, and for enabling the computer or microprocessor to interact with a human user, a software agent, and/or with other ways and means of utilizing the results of any embodiment. Such software can include, but is not limited to, device drivers, operating systems, and various user applications. Ultimately, such computer-readable media include the software for performing the previously described method in various embodiments.

System Software

Figure 25:
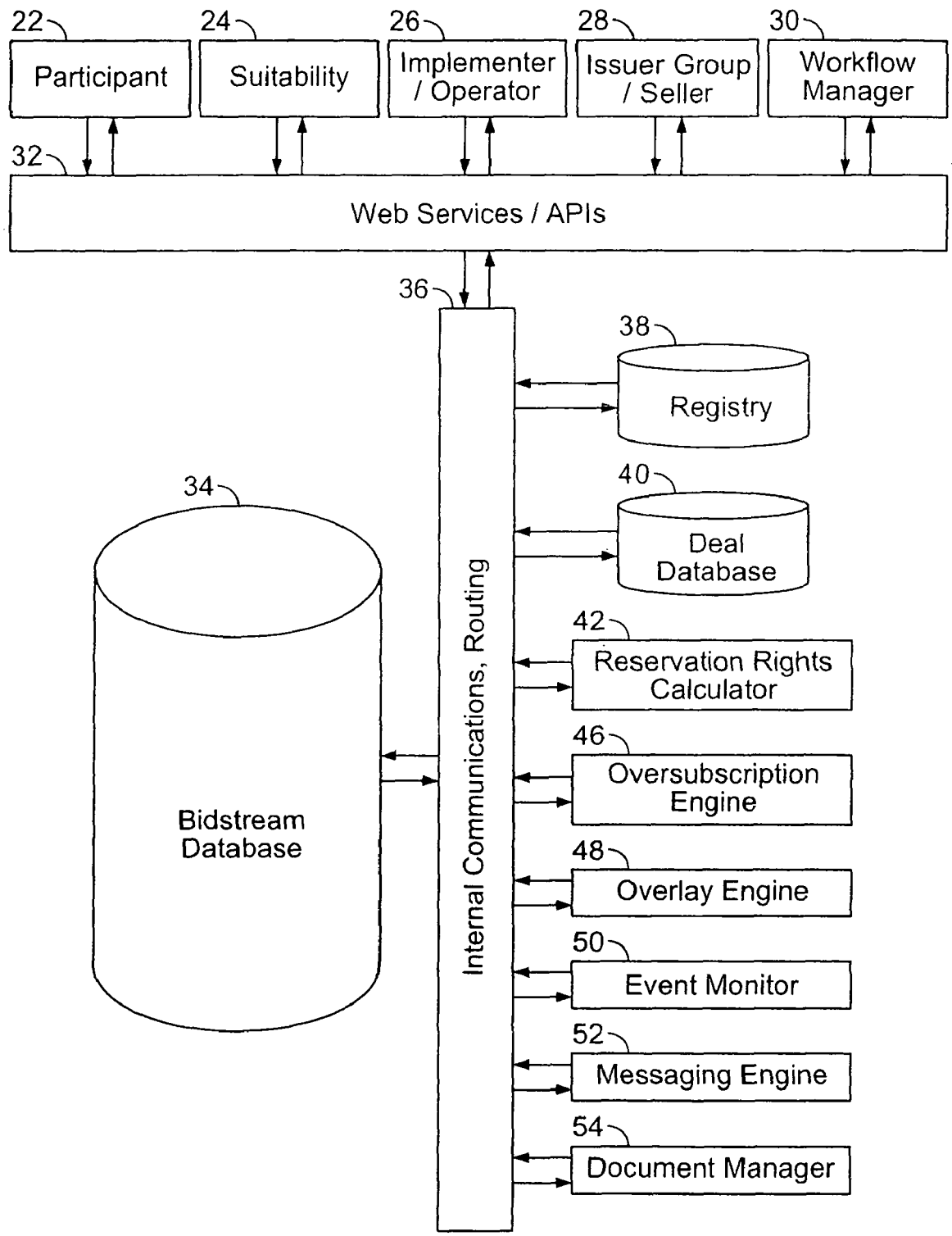
FIG. 25 shows a diagram of the system.

The software is encoded using any suitable computer language. Portions can be encoded using HTML. Providing suitable code is well within the capabilities of one of ordinary skill in the art in light of this disclosure. An example of suitable software in shown in FIG. 25, and explained hereinafter.

The Participant Module 22 contains the features necessary for the Participant to interact with the system (e.g., system access, making Reservation Rights requests, configuring Participant display and other preferences, viewing Bidstreams and overlays, etc). The Participant Module 22 can be implemented with standard software technologies through a web browser (e.g., HTML, XML, Java) or built as a stand-alone application (C++). It connects to the host system through Internet networking protocols (e.g., http) and security (e.g., PKI). It is understood that in different embodiments, the distribution of features between Participant Module 22 and the host system server will vary, as is the case for other of the modules.

The Suitability Module 24 is used by members of the Issuer Group to enter and manage Participant account data (e.g., Participant ID, password) and set account limitations (e.g., credit limits), and configure Participant-specific system usage (e.g., messaging rules, consents). This information is stored in the Registry Module 38. This module 24 can be implemented with standard software technologies through a web browser (e.g., HTML, XML, Java) or built as a stand-alone application (C++). It connects to the host system through Internet networking protocols (e.g., http) and security (e.g., PKI).

The Implementer/Operator Module 26 is used by the Bidstream designer, Issuer Group/Seller, and/or third-party operator to set up a given Bidstream (e.g., Bidstream type, initial price/yield range, allocation limits, etc.). This module can also be used to configure defaults (e.g., display characteristics and screen elements) and enable features (e.g., overlays, event alerts, etc.). This module can be implemented with developer environments (e.g., BEA WebLogic, Web Sphere) and customized (e.g., Java, Java Enterprise Beans, etc.).

The Issuer Group/Seller Module 28 is used to monitor and manage the building of a Bidstream. This is also where the final allocation and pricing are delivered when the Bidstream closes. Module 28 can be implemented with standard software technologies through a web browser (e.g., HTML, XML, Java) or built as a stand-alone application (C++). It connects to the host system through Internet networking protocols (e.g., http) and security (e.g., PKI).

The Workflow Manager Module 30 is used to configure, modify, and manage processes, particularly between modules. Module 30 is also used to configure and manage policies (e.g., delegation, escalation, notification, audit) and make changes in response to process efficiency reporting. Module 30 can be implemented with developer environments (e.g., BEA WebLogic, Web Sphere) and customized (e.g., Java, Java Enterprise Beans, etc.). It connects to the host system through Internet networking protocols (e.g., http) and security (e.g., PKI).

The Web Services Module 32 handles process and data transport to and from the host system through a services and connector registry. Module 32 can be implemented using standards tools (e.g., Java, J2EE, etc.) and using standard networking (e.g., SOAP, W3C), standard protocols (e.g., tcp/ip, http, etc.). and security protocols (e.g., https, SSL, etc.)

The Bidstream Database Module 34 handles all the major processes for building and managing a Bidstream (e.g., accepting Reservation Right requests, calculating Bidstream status and statistics, adding/canceling BidBlocks, calculating allotments and pricing). Module 34 can be implemented by using standard database technology (e.g., Oracle, DB2), with custom programming (e.g., isql, rpc, etc.), and include other services (e.g., caching, persistence technology, object services, replication, versioning).

Internal Communications and Routing Module 36 connects the other modules, and can be implemented with a standard programming language (C++).

The Registry Module 38 stores and manages all system the Participant—specific, Bidstream-specific, and Issuer Group/Seller-specific information necessary for operations (e.g., Participant management, authorization [including key and certificates], activity logs). Module 38 can be implemented by using standard database technology (e.g., Oracle, DB2), with custom programming (e.g., isql, rpc, etc.), and include other services (e.g., caching, persistence technology, object services, replication, versioning).

The Deal Database Module 40 allows the system to manage multiple Bidstreams and screen Participant access requests according to their meeting suitability requirements. Module 40 can be implemented by using standard database technology (e.g., Oracle, DB2).

The Reservation Rights Calculator Module 42 is a simple application that interacts with Participants to calculate one or more Reservation Requests for allotments at price/yield and volume combinations, according to the investing/buying strategy of the Participant. Module 42 can be implemented with a standard programming language (C++).

The Oversubscription Engine 46 is used to monitor and assist the Bidstream Database, particularly in cases where demand for BidBlock units exceeds supply. Its primary function is to manage an overallotment buffer, acknowledging new requests that exceed the total unit allotment, and canceling earlier accepted and reserved Reservation Rights, usually at the lowest price/yield point in the Bidstream. Module 46 can be implemented with a standard programming language (C++).

The Overlay Engine 48 monitors the building of the Bidstream and calculates standard visual information templates that can be layered on the graphic representation of the Bidstream or added elsewhere on the Demand Display. Module 48 can also handle ad hoc queries from system users to calculate participant-specific overlays or those containing projections and/or simulations. Module 48 can be implemented by using standard database technology (e.g., Oracle, DB2), with custom programming (e.g., isql, rpc, etc.).

The Event Monitor 50 monitors Bidstream building activity for enables system users and applications to configure rule based "triggers" or notifications that are distributed based on measurements that exceed a particular threshold. The Event Monitor 50 can also initiate activity in other modules (e.g. initiate requesting an overlay, generate and route a report, etc.) based on these event-driven criteria. Module 50 can be implemented with developer environments (e.g., BEA WebLogic, Web Sphere) and customized (e.g., Java, Java Enterprise Beans, etc.).

The Messaging Engine 52 is used to configure and operate messaging services within the system and also to and from the system. Module 52 can be implemented with developer environments (e.g., BEA WebLogic, Web Sphere), customized (e.g., Java, Java Enterprise Beans, etc.) and uses standard messaging protocols (e.g. SOAP), transports (e.g., http), and security (e.g. PKI, etc.).

The Document Manager Module 54 stores and manages offering/sales documents (including multi-media), assures document delivery where required, and generates reports. This module also contains versioning, tracking, and audit functions. Module 54 can be implemented with developer environments (e.g., BEA WebLogic, Web Sphere) and customized (e.g., Java, Java Enterprise Beans, etc.).

The following provides further detail of certain of the modules in terms of Function/Action, Data Passed, Interactions, and Description.

| Function/Action | Data Passed | Interacts With | Description |
| --- | --- | --- | --- |
| Participant Module 22 | | | |
| Opening Portal Interface | Request System Access | Web Services, Registry | Participant networks to system host. |
| Sign On | Participant ID/Cookie | Web Services, Registry | Participant requests system access. |
| Authentication | Password/Cookie | Web Services, Registry | Participant identifies himself and provides security information. This also activates a Registry session so all Participant profile information can be used by the system. |
| Reset Password | Old Password/New Password | Web Services, Registry | Participant can reset Participant ID and password information. |
| Override Default Display Preferences | User-defined Demand Display Preferences | Web Services, Registry | Participant can override display defaults (axes, layout, color coding, etc.). |
| Configure Overlays | Variables, Parameters, Criteria used by Overlay Engine | Web Services, Registry, Overlay Engine | Participant can review available Overlays (Historic, Weighted, Large Block, Oversubscription, etc.) and modify any Participant variable defaults. |
| Configure Event Monitor Alerts | User-defined Variables, Parameters, Criteria used by Event Monitor | Web Services, Registry, Bidstream Database, Messaging Engine | Participant can review and modify default Bidstream event criteria (e.g., % of Total Allotment reserved, pricing momentum, Oversubscription status, etc.) that trigger Event Monitor module and initiate event notification according to messaging rules. |
| Configure Messaging Profile | Settings for Messaging | Web Services, Registry, Messaging Engine | Participant can set criteria for desired types of and periods of system messaging. |
| Configure Document Profile | Settings for Document Delivery | Web Services, Registry, Document Manager | Participant can set additional criteria for electronic offering document and multi-media delivery (default set by Issuer Group). |
| List Deals | Request Deals | Web Services, Deal Database | Participant can request list of open Bidstreams. |
| Select Bidstream | Request Bidstream View | Web Services, Bidstream Database | Participant can request view of specific Bidstream (including Participant's accepted and registered BidBlocks). |
| Access Reservation Rights Calculator | Access Reservation Right Calculator | Web Services, Reservation Right Calculator | Participant can request access to Reservation Right Calculator. |
| Use Reservation Rights Calculator | Total Amount to Work With and Price (Yield)/Volume Reservation Rights Requests | Web Services, Reservation Right Calculator | Participant can input Total Amount to Work with and interactively try different Reservation Rights requests and view results and balances. |
| Create, Modify, Approve, Delete, Search Requests | Price (Yield)/Volume Reservation Rights Requests | Web Services, Registry, Bidstream Database | Participant can make, modify, approve one or more Reservation Right requests and delete previous Reservation Right requests. |

-continued

| Function/Action | Data Passed | Interacts With | Description |
|---|---|---|---|
| Modify Demand Display | Demand Display Options | Web Services, Bidstream Database | Participant can also search his Reservation Right request status. Participant can modify display of current Bidstream. |
| Select Overlay | Overlay Display or Overlay statistics | Web Services, Bidstream Database, Overlay Engine | Display current Bidstream with selected Overlays. |
| Encrypt/Decrypt | Send/Receive Transmission | Web Services | Transmissions to and from the system can be encrypted and decrypted. |

Suitability Module 24

| Function/Action | Data Passed | Interacts With | Description |
|---|---|---|---|
| Create, Modify, Delete, Disable, Search, Subscribe, Approve | | | |
| Participant ID | Participant ID | Web Services, Registry | Issuer Group/Seller sets Participant ID. |
| Password | Password | Web Services, Registry | Issuer Group/Seller sets initial Participant password. |
| Participant Profile | Participant Data | Web Services, Registry | Issuer Group/Seller enters any Participant account specific data. |
| Suitability Profile | Regulatory Limits | Web Services, Registry | Issuer Group/Seller identifies what types of Bidstreams Participant may access and any limitations. |
| Credit Limits | Bidding and BidBlock Limits | Web Services, Registry | Issuer Group/Seller identifies limits to the monetary or unit amounts Participant is allowed in a given Bidstream or a group of Bidstreams. |
| Messaging Profile | Default Messaging Data | Web Services, Registry | Issuer Group/Seller identifies mode of messaging (e-mail, fax, SMS, voice) and related data (e-mail address, phone numbers, etc.) and any transport related criteria. |
| Consent Profile | Approved Electronic Delivery | Web Services, Registry | Issuer Group/Seller verifies types and transmission means for messages and/or documents that have been consented to by Participant. |

Implementer/Operator Module 26

| Function/Action | Data Passed | Interacts With | Description |
|---|---|---|---|
| Set Price Range | Price/Yield Range | Web Services, Bidstream Database | Implementer/Operator sets the price (or yield) range. |
| Set Bidstream Type | Geometric, Free-Bid, Stratified, Dual | Web Services, Bidstream Database | Implementer/Operator sets Bidstream Demand Display type. |
| Set Total Allocation | Total Number of Units | Web Services, Bidstream Database | Implementer/Operator sets total number of BidBlock allocation units. |
| Set Allocation Limits | # units per Price/Yield Point | Web Services, Bidstream Database | Implementer/Operator sets any allocation limits for given price/yield points. |
| Configure Set-sides | Define fixed/floating Set-asides | Web Services, Bidstream Database | Implementer/Operator define conditions for set-aside (number of units, spread, fixed or floating, $ total vs. |

-continued

| Function/Action | Data Passed | Interacts With | Description |
| --- | --- | --- | --- |
| Configure Display Preferences | Demand Display Screen Preferences | Web Services, Bidstream Database | # of units allocation, etc.) for Dual Bidstreams. Implementer/Operator sets display defaults (axes, layout, labels, color coding, etc.). |
| Configure Oversubscription Engine | # units allowed over full subscription | Web Services, Bidstream Database, Oversubscription Engine | Implementer/Operator sets number of units of oversubscription buffer and # of oversubscription BidBlocks that trigger cancellation of Reservation Right requests. |
| Configure Next Price & Threshold Rules | Formula for next price/yield point floor | Web Services, Bidstream Database | Implementer/Operator enables formula that sets next price/yield point. In Free-bid embodiments, a formula is configured to provide a floor for new Reservation Right requests in oversubscription mode. |
| Enable Time/Volume Histogram | Enable Time Bar | Web Services, Bidstream Database | Implementer/Operator enables time/volume histogram of Bidstream activity on Demand Display. |
| Enable Lowest Price BidBlock Available Display | Enable LPBA Display | Web Services, Bidstream Database | Implementer/Operator enables LPBA Counter on Demand Display. |
| Enable Current Estimated Offering Price | Enable CEOP Display | Web Services, Bidstream Database | Implementer/Operator enables CEOP Counter on Demand Display. |
| Configure Split/Multiple Screens | Windowing Rules and Criteria | Web Services, Bidstream Database | Implementer/Operator enables split screening, multiple screens, or tabbed screens and sets rules for use. |
| Configure Overlays | Variables, Parameters, Criteria used by Overlay Engine | Web Services, Bidstream Database, Overlay Engine | Implementer/Operator enables the use of Overlays (Historic, Weighted, Large Block, Oversubscription, etc.). |
| Configure Event Monitor and Event Alerts | Variables, Parameters, Criteria used by Event Monitor | Web Services, Bidstream Database, Event Monitor, Messaging Engine | Implementer/Operator sets default conditions and parameters of Bidstream statistics that trigger event monitor module and initiate event notification according to messaging rules. |
| Configure Messaging Rules | Messaging Rules | Web Services, Bidstream Database, Event Monitor, Messaging Engine | Implementer/Operator sets default messaging rules and default transport configurations. |
| Configure Document Manager | Document Deliver Rules and Requirements | Web Services, Bidstream Database, Event Monitor, Messaging Engine, Document Manager | Implementer/Operator sets default document delivery rules and requirements. |
| Issuer Group/Seller Module 28 | | | |
| Request Bidstream Status | Request Bidstream Statistics | Web Services, Bidstream Database | Approved members of the Issuer Group/Seller can monitor Bidstream activity statistics. |

-continued

| Function/Action | Data Passed | Interacts With | Description |
|---|---|---|---|
| Request Participant Status | Reports of Approved Participant Price/Volume Requests | Web Services, Bidstream Database, Document Manager | Approved members of the Issuer Group/Seller can monitor and receive reports of specific Participant Reservation Right requests and summary logs. |
| Request Participant Activity | Request Participant Activity Logs | Web Services, Bidstream Database, Document Manager | Approved members of the Issuer Group/Seller can monitor and receive reports of specific Participant activity and summary logs. |
| Request Allocation | Bidstream BidBlock Allocations | Web Services, Bidstream Database, Document Manager | Upon closing of the Bidstream, approved members of the Issuer Group/Seller can receive lists of final allocations and pricing of those BidBlocks. |
| Workflow Manager 30 ||||
| Configure Workflow | Module Option Settings | Participant, Suitability, Issue Group/Seller, Web Services, Bidstream Database, Registry, Deal Database, Reservation Rights Calculator, Oversubscription Engine, Overlay Engine, Event Monitor, Messaging Engine, Document Manager | The Workflow Manager is used to create, modify, delete, disable, search, subscribe, and approve processes of the other modules, workflow rules, and initiate the acquisition of internal system transport, memory, and storage resources for interaction between the modules. |
| Web Services Module 32 ||||
| Authorize Transport | Transmission Authorization | Participant, Suitability, Issue Group/Seller, Bidstream Database, Registry, Deal Database, Reservation Rights Calculator, Oversubscription Engine, Overlay Engine, Event Monitor, Messaging Engine, Document Manager | The Web Services module checks the Registry to authorize all requests by Issuer Group/Seller, Implementer/Operator, or Participants. The Registry is also checked for authorization whenever automatically generated processes occur (e.g., events triggered by the Event Monitor, periodic Bidstream transmissions, etc.). |
| Package Data | Transport-specific Data Encoding | Participant, Suitability, Issue Group/Seller, Bidstream Database, Registry, Deal Database, Reservation Rights Calculator, Oversubscription Engine, Overlay Engine, Event Monitor, Messaging Engine, Document Manager | The Web Services module packages data (Bidstreams, overlays, reports, etc.) requested by Issuer Group/Seller, Implementer/Operator, or Participants. These packages are encoded according to the receiver-specific information in the Registry, the messaging rules, and known transport protocols. |
| Encrypt/Decrypt | Encrypted Data | Participant, Suitability, Issue Group/Seller, Bidstream Database, Registry, Deal Database, Reservation Rights Calculator, Oversubscription Engine, Overlay Engine, Event Monitor, | The Web Services module can also encrypt and decrypt transmission to and from the system. |

-continued

| Function/Action | Data Passed | Interacts With | Description |
|---|---|---|---|
| Transport Package | Module Provided Data, Bidstreams, | Messaging Engine, Document Manager Participant, Suitability, Issue Group/Seller, Bidstream Database, Registry, Deal Database, Reservation Rights Calculator, Oversubscription Engine, Overlay Engine, Event Monitor, Messaging Engine, Document Manager | The Web Services module acquires network resources for transmission and supports the activity sessions requested by the other modules. |

Bidstream Database 34

| Function/Action | Data Passed | Interacts With | Description |
|---|---|---|---|
| Request Suitability | Request Suitability | Registry | On any Reservation Rights request, the Bidstream Database verifies Participant profile for acceptability of Participant to make a given request (suitability, credit limits, consents, etc.). |
| Check Participant Preferences | Request Preferences | Registry | Bidstream checks any Participant Preferences (Bidstream defaults, messaging profile, etc.). |
| Accept Reservation Rights Requests | Reservation Rights Request | Web Services, Participant | If the pending Reservation Right request BidBlocks are available, the Bidstream accepts, registers, and reserves those Bidstream BidBlocks. |
| Recalculate Bidstream | Internal | N/A | Bidstream Database is recalculated with new registered BidBlocks included. |
| Display Bidstream | Transmit Bidstream | Web Services, Registry, Participant, Implementer/Operator Issuer Group/Seller, Messaging Engine | Bidstream Database either calculates Bidstream representation for a Participant's Demand Display or sends Bidstream statistics for Participant to render Demand Display locally. |
| Calculate Lowest Price/Highest Yield BidBlock Available | Internal | N/A | Bidstream Database monitors lowest price/highest yield BidBlock available. |
| Display Lowest Price/Highest Yield BidBlock Available | LPBA | Web Services, Messaging Engine, Participant | Bidstream Database sends current LPBA to Participant for Demand Display screen. |
| Calculate Current Estimated Offering Price | Internal | N/A | Bidstream Database calculates projected offering price (if any) from Bidstream statistics and Issuer/Seller formula for calculating same. |
| Display Current Estimated Offering Price | CEOP | Web Services, Messaging Engine, Participant | Bidstream Database sends current CEOP to Participant for Demand Display screen. |
| Send Current Bidstream Statistics | Bidstream Statistics | Web Services, Implementer/Operator, Issuer Group/Seller, Oversubscription Engine, Overlay Engine, Event Monitor, Messaging Engine, | Bidstream Database outputs current Bidstream variables necessary for Bidstream statistical summary tables (containing % subscribed, mean, |

-continued

| Function/Action | Data Passed | Interacts With | Description |
| --- | --- | --- | --- |
| | | Document Manager | median, weighted average, etc.), Activity or Summary Logs, and as input to Oversubscription Engine, Overlay Engine, Event Monitor, Messaging Engine, and Document Manager |
| Send Participant Status | Transmit Participant Position(s) in Bidstream | Web Services, Registry | Bidstream Database can send Participant-specific Overlays and reports that show position of Participant's still registered BidBlock positions in Bidstream. |
| Add BidBlock | # of BidBlocks to Add | Oversubscription Engine | If initiated by Oversubscription Engine, the Bidstream may add additional BidBlocks within the limits of the buffer rules. |
| Accept Oversubscription Request | Accept and Reserve Oversubscription Units | Bidstream Database | Within Oversubscription buffer limits, the system can accept additional Reservation Right requests above the current next price threshold. |
| Cancel BidBlock | # of BidBlocks to Delete | Oversubscription Engine | If one or more of a given Participant's BidBlock units are cancelled by the Oversubscription Module, the Bidstream Database deletes the BidBlock. |
| Notify Participant of Cancelled Reservation Rights Request | Notify Participant of canceled Reservation Right request | Web Services, Oversubscription Engine, Bidstream Database, Registry, Messaging | If one or more of a given Participant's BidBlock units are cancelled, the Bidstream Database initiates Participant notification of lost Reservation Right. |
| Reset Demand Display | New Demand Display Layout | Web Services, Participant | If the Bidstream requires a new layout (e.g., a new price range during oversubscription mode), new axes labels are calculated for the new Demand Display layout. |
| Reset Participant Positions | New Reservation Right Positions | Registry, Web Services, Messaging Engine, Participant | If Participant positions must be moved during a Demand Display reset to maintain the allotment limits at a given price point for a Bidstream type, affected Participants requests are moved to the adjacent price point and the Participant is notified. |
| Close Bidstream | Closing of Bidstream Message | Registry, Web Services, Messaging, Issuer Group/Seller, Participant | At a predetermined time, acceptance of new Reservation Right requests is terminated and the Bidstream is closed. |

| Function/Action | Data Passed | Interacts With | Description |
|---|---|---|---|
| Calculate Allotments | Internal | N/A | Upon closing the Bidstream, the system calculates the allotments based on accepted and registered Reservation Rights. |
| Calculate Pricing | Internal | N/A | If the pricing formula is other than pay what Participant bids, the system calculates the price of each allotment based on the disclosed formula (e.g., mean, median, weighted average, etc.). |
| Notify Allotment and Pricing | BidBlock Allotments and Pricing | Registry, Web Services, Messaging Engine, Issuer Group/Seller, Participant | Both final allotments and pricing of accepted and reserved Reservation Right requests are sent to the Issuer Group/Seller and [optionally] the Participants. |
| Registry 38 | | | |
| Receive Suitability Profile | Participant Profile Data | Web Services, Suitability | The Registry receives and stores Participant profile data provided by the Issuer Group/Seller. |
| Authenticate Participant | Participant ID and Password | Web Services, Participant | The Registry logs on and authenticates Participant system access. |
| Reset Password | Old Password/New Password | Web Services, Participant | The Registry can reset authorized Participant access information. |
| Store Participant Display Preferences | User-defined Demand Display Preferences | Web Services, Participant, Bidstream Database | The Registry can store/manage Participant-specific display preferences. |
| Store Participant Overlay Preferences | Variables, Parameters, Criteria used by Overlay Engine | Web Services, Participant, Overlay Engine, Bidstream Database | The Registry can store/manage Participant-specific overlay preferences. |
| Store Participant Event Monitor Preferences | User-defined Variables, Parameters, Criteria used by Event Monitor | Web Services, Participant, Event Monitor, Bidstream Database | The Registry can store/manage Participant-specific Event Monitor Alert criteria. |
| Store Messaging Profile | Settings for Messaging | Web Services, Participant, Messaging Engine | The Registry can store/manage Participant-specific messaging profile and messaging rules. |
| Store Document Preferences | Setting for Document Manager | Web Services, Participant, Document Manager | The Registry can store/manage Implementer/Operator, Issuer Group/Seller, and Participant-specific document profile and document delivery rules. |
| Authorize Suitability | Suitability Criteria for Reservation Right Requests | Bidstream Database | The Registry provides suitability criteria validation to the Bidstream Database when it receives a Reservation Right request. |
| Provide Participant Display Preferences | Participant-specific Display Overrides | Bidstream Database | The Registry can provide Participant-specific display criteria to the Bidstream Database for building Demand Display views. |

-continued

| Function/Action | Data Passed | Interacts With | Description |
|---|---|---|---|
| Store Participant Bidstream Activity | Participant Bidstream Activity Logs | Bidstream Database | The Registry stores logs of Participant Bidstream activity and history. |
| Provide Participant Preferences | Participant Settings | Web Services, Reservation Rights Calculator, Overlay Engine, Event Monitor, Messaging Engine, Document Manager | The Registry supports other modules with Participant-specific data on preferences and settings. |
| | | Deal Database 40 | |
| Receive Participant Deal Request | Participant Deal Criteria | Participant, Web Services, Messaging Engine | Participant requests types of deals he is interested in and any limiting or sorting criteria. |
| Validate Suitability | Request Suitability | Registry | Deal Database checks Participant Suitability Profile before sending one or more listings of currently open Bidstreams. |
| Sort Deals | Internal | N/A | Deal Database prepares and sorts open Bidstream list meeting Participant request criteria that: 1) are open; 2) meet Participant request criteria; and 3) meet Participant suitability criteria. |
| Send Deals | List of Deals | Participant, Web Services, Messaging Engine | Deal Database sends list of available Bidstreams that meet request criteria or are selected by Participant preferences. |
| | | Reservation Rights Calculator 42 | |
| Receive Request Total Available | $'s Available to Bid | Participant | Reservation Right Calculator receives total monetary or unit quantity amount Participant would like to work with. |
| Receive Request | Price/Volume Reservation Right Requests | Participant | Reservation Right Calculator receives one or more Reservation Right requests for allocations. |
| Calculate Reservation Right | Internal | N/A | Reservation Right Calculator calculates the number of Bidstream BidBlocks necessary to fill request. |
| Check Reservation Right availability | Price/Volume Reservation Right Requests | Bidstream Database | Reservation Right Calculator checks whether the current Reservation Right request can be accepted. |
| Send Balance | Reservation Right Totals and Balance | Messaging Engine, Web Services, Participant | Reservation Right Calculator either rejects request (if Reservation Right Bidstream BidBlocks are not available) or sends calculation of Reservation Right requests and balance of request total available. |

-continued

| Function/Action | Data Passed | Interacts With | Description |
|---|---|---|---|
| Request Additional Reservation Right Requests | Request Additional Bids | Messaging Engine, Web Services, Participant | Reservation Right Calculator asks Participant whether they would like to re-bid and/or request additional Reservation Rights. |
| Oversubscription Engine 46 | | | |
| Monitor Bidstream Status | Internal | Bidstream Database, Event Monitor | Based on Total Allocation units set by Implementer/Operator, determine % of Bidstream reserved. Based on pricing momentum, project time to Oversubscription Event. |
| Initiate Addition of Oversubscription Units | # of Units added to Bidstream as Oversubscription Buffer | Bidstream Database | As Bidstream hits condition of where total BidBlock units allotted are reserved, Oversubscription Module can make available additional BidBlock units according to threshold and buffer rules and allow display on Demand Display. |
| Cancel Reservation Right Request | # of Units to be cancelled | Bidstream Database | Oversubscription Module can initiate the cancellation of one or more lowest price Reservation Right requests based on whether Bidstream rules optimize total proceeds or require a fixed total # of units. |
| Overlay Engine 48 | | | |
| Monitor Bidstream | Bidstream Statistics | Web Services, Participant, Implementer/Operator, Issuer Group/Seller, Bidstream Database, Registry, Event Monitor | The Overlay Engine monitors the Bidstream Database statistics and recalculates various overlays that have been configured by the Implementer/Operator or the Participant. |
| Transmit Overlay | Bidstream Overlay | Web Services, Participant, Implementer/Operator, Issuer Group/Seller, Bidstream Database, Registry, Event Monitor, Messaging Engine | The Overlay Engine transmits Bidstream overlays that have been requested by the Participant, Implementer/Operator, Issuer Group/Seller, or have been triggered by the Event Monitor. |
| Event Monitor 50 | | | |
| Monitor Events | Bidstream Statistics, Oversubscription Statistics, Overlay Statistics | Web Services, Participant, Implementer/Operator, Issuer Group/Seller, Bidstream Database, Registry, Overlay Engine, Messaging Engine | The Event Monitor monitors the Bidstream Database statistics and recalculates thresholds that might trigger activity by other modules. These thresholds are event criteria that have been configured by the Implementer/Operator, Issuer Group/Seller, or the Participant. |

-continued

| Function/Action | Data Passed | Interacts With | Description |
| --- | --- | --- | --- |
| Initiate Event Alert | Event Alerts | Web Services, Participant, Implementer/Operator, Issuer Group/Seller, Bidstream Database, Registry, Overlay Engine, Messaging Engine, Document Manager | If an Event Alert is triggered by exceeding thresholds configured by Implementer/Operator, Issuer Group/Seller, or the Participant, the Event Monitor triggers the system activity and initiates transmission (sending Bidstreams, activity logs, etc.). |
| Messaging Engine 52 | | | |
| Initiate Message | Participant Profile | Registry, Oversubscription, Event Monitor | The Issuer Group/Seller, Implementer/Operator, or Participant may set up and automate event-driven (e.g., oversubscription, lost Reservation Right, etc.) and/or periodic Bidstream Demand Display. |
| Check Participant ID, Messaging Profile, and Consents | Participant Profile | Registry | Before sending any requested or periodic Demand Displays representations, Overlays, Event Alerts, or reports, the Messaging Module checks Participant profiles for Participant messaging parameters. |
| Transmit Message | Bidstream Displays, Bidstream Statistics, Overlays, Documents | Web Services, Bidstream Database, Oversubscription Engine, Overlay Engine, Event Monitor, Document Manager | The Messaging Engine services the Bidstream Database, Overlay Engine, Event Monitor, and Document Manager according to messaging rules set by the Participant, Implementer/Operator, or Issuer/Seller and according to their requests for activity or information. |
| Document Manager 54 | | | |
| Store Offering Documents | Offering Documents | Web Services, Issuer Group/Seller | The Document Manager stores/manages offering documents provided by the Issuer Group/Seller. |
| Send Offering Documents | Offering Documents | Web Services, Participant, Implementer/Operator, Issuer Group/Seller, Registry, Suitability, Messaging | The Document Manager transmits offering documents provided by the Issuer Group/Seller. |
| Send Bidstream Activity Logs | Bidstream Activity Logs | Web Services, Participant, Implementer/Operator, Issuer Group/Seller, Registry, Bidstream Database, Messaging Engine | The Document Manager generates activity reports based on Participant activity and Bidstream activity and transmits them when requested by authorized Participants, Implementer/Operators, Issuer Group/Sellers. |

-continued

| Function/Action | Data Passed | Interacts With | Description |
|---|---|---|---|
| Send Participant Status Reports | Reports of Approved Participant Price/Volume Requests | Web Services, Participant, Implementer/Operator, Issuer Group/Seller, Registry, Bidstream Database, Messaging Engine | The Document Manager generates Participant status reports based on Participant activity and Bidstream activity and transmits them when requested by authorized Participants, Implementer/Operators, Issuer Group/Sellers. |
| Send Final Allocations | Final Report of Approved Participant Price/Volume Requests | Web Services, Participant, Implementer/OperatorIssuer Group/Seller, Registry, Bidstream Database, Messaging Engine | The Document Manager generates Final Allocation reports listing Participant allocations and pricing, and transmits it to the Issuer Group/Sellers. |

Detailed Example

U.S. Securities Pricing Environment

Embodiments can be used over the range of pricing optimization and allocation determinations in just the new issuance of equity and/or debt securities alone, including, but not limited to: 1) pre-filing testing of the waters; 2) a post-filing creation of a Bidstream of Reservation Rights before and/or after the registration of any securities is effective; 3) the offering of warrants or similar instruments, before and/or after the registration of securities; and 4) even in a full-blown auction mode, whereby the placement of reservations in the system serves as the binding basis for the placement of the anticipated securities.

Certain securities-related embodiments can be adjusted and/or scaled back to accommodate compliance with prevailing securities laws and regulations of relevant jurisdictions. While it is beyond the scope herein to examine every jurisdiction, financial market, and financial exchange for which the System is applicable, the following is directed to embodiments that apply to the largest market for new issuances—that of the United States securities market. The following is illustrative only and not intended to constitute legal advice.

Since the set-up and breakdown of temporary marketplaces for non-binding indications of interest that do not execute or trade securities is still a novel concept, there are no direct rulings (or No-action indications) by the SEC as to how embodiments of the present system would fit within the regulatory framework (of the U.S. Securities Act and the Securities Exchange Act, the U.S. Indenture Act, and the rules and regulations related to new issuances of equities, corporate debt and municipal securities) and remain consistent with the stated policy goals of simultaneously developing efficiency and improving investor protection. Nevertheless, the following examines previous treatments of various primary and secondary market methods for handling actual securities for embodiments in the U.S. until the issues surrounding electronic indications-of-interest are clarified by the Securities Exchange Commission.

Written vs. Oral Communications

In today's markets, where speed is a priority, significant matters often are communicated telephonically. For instance, it is common and increasingly popular, for security holders to vote proxies and even transfer assets by telephone, where permitted under applicable state law. However, electronic communications do not always fit neatly into one category or the other. While often thought of as a substitute for telephonic communications, e-mail messages are fixed in graphic form, can be retained, and often are much more detailed than oral conversations. Due to concerns that electronic communications can easily influence prospective investors, the SEC has been reluctant to characterize e-mail including attachments as other than written communications.

In addition, investors can place orders to trade securities by telephone. The SEC believes these practices have developed because business can be transacted as effectively by telephone as it can on paper. It is believed that the request for a Reservation Right is an oral communication, since it is akin to the placing of a phone call as an expression of interest to a member of the underwriter syndicate and their associated broker-dealer network under the current manual book building process. However, the Commission has previously considered electronic communications to be written, and has yet to address the nature of an interactive electronic communication component of the System that replicates the interaction that would currently occur in a series of phone calls between a potential investor and his broker under the current manual book building process.

Waiting Period Communications

During the post registration-filing, called the waiting period, the underwriter syndicate can test the market by communicating with their customers, limited only by the antifraud provisions of the Securities Act and Securities Exchange Act. However, the underwriter syndicate and broker-dealers must not make offers to sell other than through the statutory prospectus. What is deemed to be free writing is still prohibited. It is believed that display of requests for Reservation Rights are material facts and, thus not a form of free writing in that they are not subjective opinions, but reflect transparent, symmetric, higher quality, and more timely real-time disclosure to the investing public.

However, the underwriter syndicate and broker-dealers can orally solicit indications-of-interest in the new issuance and discuss the securities with their clients. This is collection of interest from persons/institutions is what is referred to in the opening of this patent application as the manual book building process, wherein the underwriter syndicate accesses the interest and begins to make decisions about pricing the new issuance and the allocation of participation in the issuance. This is where embodiments create a more open, efficient, equitable, and fair determination of the pricing/demand elasticity, and thereby optimize the pricing and fair allocation of the anticipated distribution of the securities.

Before effectiveness, communications on an e-broker's as well as on the issuer's website that make an offer to sell or solicit an offer to buy can only be made by means of a prospectus complying with securities law or by communications that come within the safe harbor of securities law. Communications that are merely instructional and are not designed to generate interest in a particular offering typically are unobjectionable, even if they do not fall within the safe harbor of securities law.

This is an additional consideration for an underwriting syndicate to have the system implemented by a third party. The underwriting syndicate would still be responsible for all regulatory obligations other than the establishment and optimization of the pricing of the new issuance, and thus might coordinate the strategy and timing of the operation of a System embodiment by such third party.

Again, the databases generated by the System create time and cost savings to members of the Issuer Group in automating as many of the red herring and statutory prospectuses delivery processes as are possible and assisting in the initiation and tracking of the required manual processes.

General Solicitation

One concern with respect to online private offerings relates to the prohibition against general solicitation. The prohibition was originally intended to ensure that access to private offerings was limited to sophisticated or accredited investors who do not need the protections of the federal securities laws. The SEC has indicated that, under certain circumstances, websites affiliated with registered broker-dealers might be used to raise capital privately, as long as prospective investors are screened before they are allowed to view the offering materials.

To resolve the issue under securities law, the electronic auction presentations described in the released SEC No-action letters are made part of a prospectus permitted by securities law. The letters state that the auction screens must be made accessible only through the electronic prospectus. This means that a potential investor could access the auction screens only by entering the electronic prospectus and clicking a button from within the prospectus that leads to the auction. This method makes the auction screens part of the electronic prospectus.

Access to the auction screens from a hyperlink within the electronic prospectus makes the auction site part of the permitted prospectus. In contrast, a hyperlink from a separately accessible auction site to the electronic prospectus would merely cause the documents to be delivered together. Without additional steps to clarify that the auction screens are part of the prospectus, the auction screens would not be part of the electronic prospectus. Therefore, making the auction screens available separate from the electronic prospectus, and simply hyperlinking to the prospectus, will not alleviate the concern that the auction screens are non-conforming prospectuses.

The method described, whereby the underwriter makes the auction site accessible through the electronic prospectus, is not the exclusive method to make a document part of the electronic prospectus. For example, the electronic prospectus could be represented by means of its table of contents, with each item in the table presented as an active hyperlink to the section of the prospectus that the item represents. If the auction site is presented as an item in the table of contents, the hyperlink to the auction site from the table of contents generally would make the auction site a part of the prospectus. Similarly, it is believed that the electronic auction could be presented on a web page next to the electronic prospectus along with a statement that the auction web page is part of the prospectus.

In some embodiments, to meet registration filing requirements of various legal jurisdictions, adjustments to the registration filing statements or to the functioning of the System might be required. For example, in the United States, the Securities Act permits a registrant to omit information concerning the public offering price, price-related information and the underwriting syndicate from a registration that is declared effective. In such cases, the information omitted would either be included in the final prospectus and incorporated by reference into the registration statement, or included in a post-effective amendment to the registration statement. Relevant information must be disclosed in a post-effective prospectus, or it might be revised in a post-effective amendment to the registration statement (e.g., a term sheet).

The red herring prospectus, and any implementation of the system, must also comply with securities regulations requiring that any preliminary prospectus to be used before the effective date of the registration statement (or any post-effective prospectus that omits information permitted by law), and will be made whole through a pricing amendment, contained in red ink, the caption Subject to Completion, and a specifically prescribed legend disclaiming any intention to sell or solicit and offer to buy the securities of the new issuance.

An electronic display of a dialog box with these cautions/stipulation can be displayed requiring the prospective investor or their agent to acknowledge their acceptance of these conditions before being allowed further access to the system. This electronic record of acknowledgement, in fact, provides the issuer/underwriter better liability protection than a paper version, which only assumes that the reader acknowledges that the prospectus is incomplete and that further information will be required before a bona fide sale or offer to sell will be conducted.

While the issuer and underwriter syndicate have discretion in using the System to determine and optimize the offering price before or after the effective date, their leeway is limited. The timing of the implementation of the Bidstream creation process and its duration is a strategic decision, which might be made by the issuer/underwriter based on this pre- and post-effective window.

Thus, Implementers within the post-effective window can employ electronic and possibly manual notifications to ensure that final prospectus and price amendment distributions requirements are met. Again, the databases generated by the System create time and cost savings to the members of the Issuers Group in automating and/or supporting as much of the process as is possible, and assisting control of the required manual processes.

Typically, when the pricing terms of an offering are finalized, changes are often made to the size of the offering by adjusting the offering price and/or the number of shares to be registered. However, the Issuer is permitted to register securities in an offering by specifying only the title of the class of securities to be registered and the proposed maximum aggregate offering price. Thereafter, an issuer is not required to register additional securities if the number of shares increases, provided that the aggregate dollar amount of the offering does not exceed the maximum aggregate offering price previously registered. Also, registration is not required for a decrease or increase of the offering size (if such increase does not require the registration of additional securities) and/or a deviation from the specific price range, provided that the combined size and price do not exceed more than 20 percent change from the maximum aggregate offering price previously registered.

Where the system is used during an effective registration in the United States, the issuer might have to make a decision as to whether to let the system run its course and make the necessary amended filings and maximize the proceeds to the company, or to cap the aggregate offering size under the permitted 20 percent overage restriction. This can be achieved through the system itself, in the case of oversubscription approaching the 20 percent overage restriction (including a prudent buffer) whereby a corresponding dollar amount of Reservation Rights is removed at the lowest price (i.e., more than one Reservation Right might have to be removed to accommodate a higher price Reservation Right) to keep the aggregate maximum offering price within the chosen boundary. This is a strategic choice of the issuing company and its underwriters, and not a limitation of the System.

Plan of Distribution

In some regulatory and legal jurisdictions, securities regulations might require a description of the plan of distribution of securities to the public and the terms on which the distribution is to be made. To the extent that some or all of the pricing and allocation decisions can be made with the assistance of the System, this might need to be disclosed with the registration statement.

In this case, the Issuer Group might be advised to request a pre-filing conference with the SEC to fully disclose and explain their implementation of embodiments of the system, as well as request a No-action letter until the use of the system becomes more commonplace. Registration statements that omit pricing information in reliance on securities rules include the price range on the cover page or, when appropriate, the formula or method by which the price is to be determined. In cases of early uses of the system, and/or implementations where new embodiments to the basic system are anticipated, this pre-filing conference with the SEC staff becomes an opportunity for the managing underwriter team and the SEC staff to arrive at mutually agreed language and legends to be included with the registration statement and preliminary prospectus describing the implementation of the System embodiment.

In any case, attention to the SEC staff initial review letter becomes particularly important with respect to the issuer/underwriter's disclosure of their intent to use the system (for pricing and allocation optimization, and the manner in which it will be implemented) because it reflects the SEC's consideration of different facets of the offering, such as legal compliance of the underwriting arrangements and the plan of distribution. The SEC might request supplemental information and/or request revision or clarification of the registration statement.

Electronic Road Shows

There are many creative uses of the Internet to tell a company's story. Electronic prospectuses can, and do, include video, sound, graphics and interactivity. In some System embodiments, any multi-media materials provided as part of the prospectus require filing, as an appendix to the prospectus, the script of any video and a fair and accurate narrative description of the graphic or image material, just as it would be necessary to provide to the SEC supplementary scripts and descriptions of such material in sales material.

Electronic Roadshows—an electronic rendition of a roadshow distributed over private networks and/or the Internet—puts the SEC in a position that appears, on the face of it, contradictory. By and large, the presentation of the roadshow is an electronic transmission of what was previously an oral communication. As previously mentioned, communications by radio or television in connection with an offering are treated as written communications under securities law. Moreover, the term prospectus is defined broadly under securities law as any notice, advertisement, or communication, written or by radio or television, which offers a security for sale or confirms the sale of a security. It appears inconsistent to allow transmission of electronic roadshows over the Internet, and yet treat e-mail communications reflecting the same content an oral telephonic non-transaction communications to a broker-dealer, including communication that is neither an offer nor an offer to sell a security as prohibited written communication. This apparent inconsistency remains unresolved.

Indications of Interest

The Securities Act allows the publication of solicitations of interest during the waiting period, as long as they are accompanied or preceded by a red herring prospectus. An indication-of-interest can be posted on a web site and accepted electronically. Participants in the system are not required to access the red herring prospectus before accessing, downloading, and/or printing any electronic form for indications of interest. However, the Issuer Group and/or Implementers might require an embodiment to require evidence of informed consent of Participants, either directly or indirectly through affirmation that a member of the Issuer Group, before sending and receiving communication related to indications of interest. The system can require previous evidence of receipt of the red herring prospectus, or concurrent execution of delivery of the red herring prospectus be executed, before a password is issued that allows a Participant to enter any anticipated offerings sections of the system, depending on offering-specific consent or global consent.

It is believed that a communication sent or delivered to any person pursuant to Securities law using the system (accompanied or preceded by a prospectus which meets the requirements of the Securities Act at the date of such communication) can solicit from the recipient of the communication an offer to buy the security or can request the recipient to indicate on an enclosed or attached coupon or card, or by some other manner, whether he might be interested in the security, if the communication contains substantially the following statement or its equivalent:

Reservation Rights are not securities. The placement of a request for a Reservation Right is a non-binding reflection of interest in an anticipated offering of securities that has its own mandatory documentation and disclosures (pursuant to the Securities Act) prior to the effectiveness of an offer, offer for sale, and/or sales of registered securities.

No offer to buy the securities can be accepted, and no part of the purchase price can be received, until the registration statement has become effective, and any such offer can be withdrawn or revoked, without obligation or commitment of any kind, at any time prior to notice of its acceptance given after the effective date. An indication of interest in response to this advertisement will involve no obligation or commitment of any kind.

Reservation Rights Versus Securities

The term "investment contract" is undefined by the by the Securities Act. However, certain U.S. state security Blue Sky laws pre-existing the U.S. Federal Securities Acts have generated interpretations where form was less important than substance, thus the focus on economic reality. An investment contract has been interpreted as a contract or scheme for the placing of capital, or laying out of money, in a way intended to secure income or profit from its employment. It is immaterial whether the investment contract is evidenced by shares of stock certificates or by interests in the physical assets of a common enterprise.

It is believed that the system does not create a security in embodiments where a Reservation Right is reserved where it is: 1) non-binding; 2) transferable; and 3) for no value. Therefore, sections of both the Securities Act and the Securities Exchange Act, which rely upon the existence of a security, might not be applicable to most embodiments of the present system.

Warrants

However, in some cases, Implementers might choose to offer options or warrants instead of Reservation Rights. This creates gray areas wherein the timing and the manner of use of the warrant embodiment might place certain responsibilities on members of the Issuer Group, which they should take heed.

In an alternative embodiment, non-binding, future date warrants can be used in place of Reservation Rights. For relevant portions of the Securities Act to become operative, there must be a sale or offer of a security. The law defines the term sale to include every contract of sale or disposition of a security for value. However, a warrant or right to subscribe to a security is itself a security by the express terms of the law. The fact that a restricted stock is non-transferable might not in and of itself remove it from this category. Nevertheless, a warrant, option, or right to subscribe need not be registered unless it is offered to be disposed of for value. As a matter of defining the exercise date of a warrant, if immediately exercisable, it might constitute an offer to sell the security called for in the warrant, thus making the registration requirements applicable to that security. Thus, in the ordinary rights offering in which transferable warrants are issued to shareholders or potential investors without any consideration, the warrants themselves need not be registered. Nonetheless, in this embodiment the exercise of the warrants reserved though the building of the Bidstream would in fact not occur until after the registration becomes effective, and particular care should be taken by the underwriter syndicate and broker-dealers to disclose this fact.

Once the creation of the Bidstream is closed, the pricing of the warrants becomes fixed until the offering becomes effective, even though no value has been exchanged. If the warrant embodiment of the System were employed, the warrants would be exercised once the offering is effective and the securities are registered for sale. The restricted period commences upon mailing of the notice, and continues through the end of the period in which the security holders might decide whether to convert.

Only once the warrant is exercised is a sale considered to take place. However, since the warrant is itself a security, securities law needs to be taken into account. The actual material rights of the warrant, and the security which it might be exchanged for in an offering might constitute a securities exchange in the interpretation of the SEC, and thus might be seen as an exchange of new securities for old, even though they might be registered simultaneously. To the extent that this is true, issuers and underwriters using the warrant embodiment method might have to pay particular attention to offering limitations and integration issues that vary, based upon the aggregate size of the offering within a given timeframe and any material changes to the charter amendment in the state of incorporation to avoid delays.

Neither the existence of exercisable warrants or convertible securities, nor the approaching expiration date of such securities alone, would cause the issuer to be deemed in distribution. However, a distribution could be present if special selling efforts, such as the solicitation to exercise the warrants or the payment of a soliciting dealer's fee, are used to encourage the exercise of the securities.

Here again, the present system can be used to deliver, and confirm delivery of, compliant documents. This aspect of this embodiment saves members of the Issuer Group time, money, and effort in meeting delivery requirements, and can also assist in tracking and initiating manual processes that include delivery of required documents to persons who chose the mails (rather than electronic delivery) as their chosen method of receipt of offering-related materials. These efficient processes of completing the statutory prospectus delivery process then allow the underwriting syndicate and broker-dealers to e-mail or mail confirmation of the sale and/or make delivery of the securities and complete the transaction, thus streamlining the processes required for the underwriter syndicate and broker-dealers to meet their three day business deadlines. The system can also be used during the post-effective period to meet or assist in the tracking of delivery requirements. The system implementation can also include a provision for notifying broker-dealers of their delivery obligation and the date of their effective termination in meeting securities law requirements. If the offering continues over an extended period of time, the prospectus can be kept current under the requirements of law, another manner in which the system can assist the underwriter syndicate in its delivery obligations in an efficient and cost-effective manner.

An Implementer can use an alternative embodiment to operate the system to arrive at optimized pricing and achieve fair and equitable allocations, by conditionally selling new issuance securities in the short window between the effective date and the 15-day deadline for a final prospectus, subject to confirmation only after the requirements of a prospectus or its equivalent, have been met. See below.

In this embodiment, the operation of the system reflects many aspects of a true auction, albeit with superior transparency and feedback to the bidder, superior price-building access, competition, efficiency and optimization of final pricing; superior methods for fair, equitable, and widespread allocation of the new issuance; and superior methods for assisting the underwriter syndicate in meeting their disclosure obligations, and tracking and confirming the meeting of their obligation for delivery of offering materials in compliance with SEC regulations.

It is also conceivable that some Issuer Groups might, for strategic and liability reasons, chose the operate the system in two stages: 1) to operate one embodiment during the waiting period in conjunction with a red herring prospectus (and required/associated legends on the system displays) to establish price/demand elasticity and establish a fair and equitable baseline starting price (or price range) for the benefit of the issuer; and 2) to run another embodiment of the system again in the post-effective period, in conjunction with a compliant prospectus and in combination with additional selling literature and other allowed information distribution (e.g. links to industry analyst reports, electronic roadshow distribution, etc.) to optimize and determine any further final pricing adjustments, and establish final allocations as of the date and time of the close of the Bidstream build process.

Professional Services and Promotion

In determining the relative roles of the investor and any third party promoter, the legal form of the relationship is not controlling. Again, the economic realities (or context) should be considered in assessing whether the efforts of a promoter before the investor's purchase of a contract or other instrument can be considered in determining whether the investor was dependent predominantly on the efforts of the promoter. In the case of an embodiment in the U.S., the promotion is essentially a collection of data from the potential investment community and, typically, the promoter neither runs the offering and/or sale of the securities (as is the case of the issuer and/or underwriter) nor manages, controls, or operates the enterprise.

Operation of embodiments might be considered by some as a special selling effort/method. This is another reason for pre-filing disclosure of the plan of distribution, using the system and in coordination with the SEC staff, on the acceptability of the implementation of the anticipated embodiments and its description in registration statement documents and prospectuses (or their equivalents).

Those Issuer Groups introducing embodiments of the system might be generally advised to seek communications with the SEC to obtain a No-action letter.

Anti-Trust & Liability Considerations

Another advantage to the underwriter in using the present system is that the price and the allocation distribution is principally not set by the underwriter syndicate, but by the public itself—mitigating or eliminating any liability that could be derived by allegations of monopoly-driven or collusive price fixing, and the varieties of allegation of allocations abuses that are driving an increasing number of lawsuits. This assumes that the underwriter syndicate is not abusing the system itself by withholding an inordinate amount of the total offering through implementation of the embodiment that allows for significant set-asides (whether disclosed or not).

Implementation of the system can act as an automated, impartial gatekeeper to protect against unfairly influencing the development of an efficient price and the fair and equitable distribution of allocations—arguably mitigating some of the civil liability exposure of the underwriter syndicate and broker-dealers.

The system might result in wider distribution of smaller allotments, as the system opens fair, affordable, and equitable pricing and opportunity for ownership to the general, long-term investing public. Arguably, wider distribution of smaller allotments would also result in lower after-market volatility (assuming that the system is efficient in pricing optimization). Ideally, the after-market price might move little or not at all, to the relief of the issuing entity. Over a longer period of time, wider distribution of smaller allotments would also diminish volatility because moves made by individual investors for their own personal or portfolio needs would have less impact or influence on volatility than institutional investors, who might sell large blocks for purely exogenous and spurious factors having nothing to do with the issuer itself. Lower volatility would also benefit the issuer in that management could concentrate on building long-term shareholder value, instead of after-market price maintenance efforts.

Although this disclosure describes in detail certain embodiments, and has provided numerous illustrative examples, it is also the case that certain variations, combinations, and modifications are also within the scope of the System, including but not limited to: (1) derivatives and derivative works of the system; (2) additional embodiments using one or more components of the system; and (3) application of the system techniques, methods, and methodologies to applications beyond the securities industry and its related affiliated and associated industries and businesses. This description is illustrative, not limiting; further modifications will be apparent in light of this disclosure and are intended to fall within the scope of the appended claims.

I claim:

1. A computer-implemented method for requesting one or more reservations for a set of debt instruments to be offered by an issuer for later sale comprising the steps of:
    (a) transmitting, from one or more processors which are operatively connected to one or more communication devices, a first set of one or more signals to request information from one or more servers relating to a debt offering, wherein the debt offering comprises a plurality of units of one or more types at one or more yields that are available for reservation, wherein
        (i) each of the units of the debt offering is intended to be offered as debt instruments for later sale to potential debt purchasers, and
        (ii) for at least one of the types at least one of the yields, a plurality of units is available for reservation;
    (b) receiving, at the one or more processors via the one or more communication devices, a second set of one or more signals sent from the one or more servers at a first time that identify the status of the plurality of units of the debt offering, wherein the status comprises an identification of
        (i) units of the debt offering for each type at each yield that are available for reservation as of the first time, including the type, yield and number of units available for reservation, and
        (ii) one or more sets of units of the debt offering that have been reserved as of the first time, including the type, yield and number of units that have been reserved;
    (c) transmitting, from the one or more processors via the one or more communication devices, a third set of one or more signals to the one or more servers that indicate a request to reserve a first group of one or more of the units of the debt offering; and
    (d) receiving at the one or more processors via the one or more communication devices, a fourth set of one or more signals sent from the one or more servers at a second time that identify
        (i) units within plurality units of the debt offering that are yet available for request for reservation as of the second time, including the type, yield and number of units available, and
        (ii) one or more sets of units of the debt offering that have been reserved, including the type, yield and number of units reserved as of the second time, wherein the one or more sets of units that have been reserved include at least a first set of units within the first group that were available for reservation.

2. The method of claim 1, further comprising the step of receiving at the one or more processors via the communication device, a fifth set of one or more signals sent from the one or more servers at a third time that identify
    (i) units within plurality units of the debt offering that are yet still available for request for reservation as of the third time, including the type, yield and number of units available,
    (ii) the one or more sets of units that have been reserved, including the type, yield and number of units reserved as of the third time, wherein the one or more sets of units that have been reserved include at least the first set of units within the first group, and a second set of units.

3. The method of claim 1, wherein the yield comprises one or more of the following: a yield rate, an interest rate, a coupon rate, a yield equivalent, a yield-to-maturity rate, a yield-to-call rate, a yield-to-worst-call rate, and a spread from an index.

4. The method of claim 1, wherein a threshold yield for requests for reservations is set.

5. The method of claim 1, wherein the number of units of a particular type of the debt instrument offering available at a particular yield is limited to less units than the total number of units of the debt instrument offering.

6. The method of claim 1, wherein the debt instruments, when offered for later sale, comprise corporate bonds.

7. The method of claim 1, wherein the debt instruments, when offered for later sale, comprise commercial paper.

8. The method of claim 1, wherein the debt instruments, when offered for later sale, comprise municipal bonds.

9. The method of claim 1, wherein the debt instruments, when offered for later sale, comprise international bonds.

10. The method of claim 1, wherein the debt instruments, when offered for later sale, comprise sovereign debt.

11. The method of claim 1, wherein the debt instruments, when offered for later sale, comprise sub-sovereign debt.

12. The method of claim 1, wherein the debt instruments, when offered for later sale, comprise public debt.

13. The method of claim 1, wherein the debt instruments, when offered for later sale, comprise securitization of assets.

14. The method of claim 1, wherein the debt instruments, when offered for later sale, comprise notes.

15. The method of claim 1, wherein the debt instruments, when offered for later sale, comprise convertible debt securities.

16. The method of claim 1, wherein the one or more types comprise debt instruments of a series.

17. The method of claim 1, wherein the one or more types comprise debt instruments having the same maturity.

18. The method of claim 1, wherein the one or more types comprise debt instruments having the same coupon rate.

19. The method of claim 1, wherein the one or more types comprise debt instruments available for reservation by a predetermined investor class.

20. The method of claim 19, wherein the predetermined investor class comprises one or more institutional investors.

21. The method of claim 19, wherein the predetermined investor class comprises one or more retail investors.

22. The method of claim 19, wherein the debt instruments for the predetermined investor class have a predetermined yield.

23. The method of claim 19, wherein the number of units of debt instruments for the predetermined investor class is fixed.

24. The method of claim 19, wherein the debt instruments for the predetermined investor class have one or more yields calculated based on the yields of other reservations outside the predetermined investor class.

25. The method of claim 1, wherein the first set of units comprises all of the units of the first group.

26. The method of claim 1, wherein the first set of units comprises less than all of the units of the first group.

27. A computer system for requesting one or more reservations for a set of debt instruments to be offered by an issuer for later sale comprising:

(1) one or more communications devices;
(2) one or more processors which are operatively connected to the one or more communication devices;
(3) one or more computer readable media having stored thereon computer instructions for carrying out the steps of:
  (a) transmitting, from the one or more processors via the one or more communication devices, a first set of one or more signals to request information from one or more servers relating to a debt offering, wherein the debt offering comprises a plurality of units of one or more types at one or more yields that are available for reservation, wherein
    (i) each of the units of the debt offering is intended to be offered as debt instruments for later sale to potential debt purchasers, and
    (ii) for at least one of the types at least one of the yields, a plurality of units is available for reservation;
  (b) receiving, at the one or more processors via the one or more communication devices, a second set of one or more signals sent from the one or more servers at a first time that identify the status of the plurality of units of the debt offering, wherein the status comprises an identification of
    (i) units of the debt offering for each type at each yield that are available for reservation as of the first time, including the type, yield and number of units available for reservation, and
    (ii) one or more sets of units of the debt offering that have been reserved as of the first time, including the type, yield and number of units that have been reserved;
  (c) transmitting, from the one or more processors via the one or more communication devices, a third set of one or more signals to the one or more servers that indicate a request to reserve a first group of one or more of the units of the debt offering; and
  (d) receiving at the one or more processors via the one or more communication devices, a fourth set of one or more signals sent from the one or more servers at a second time that identify
    (i) units within plurality units of the debt offering that are yet available for request for reservation as of the second time, including the type, yield and number of units available, and
    (ii) one or more sets of units of the debt offering that have been reserved, including the type, yield and number of units reserved as of the second time, wherein the one or more sets of units that have been reserved include at least a first set of units within the first group that were available for reservation.

28. The system of claim 27, wherein the instructions are stored on the one or more computer readable media as a plurality of packets of data received via the one or more communication devices.

* * * * *